(12) United States Patent
Honey

(10) Patent No.: US 9,901,032 B2
(45) Date of Patent: Feb. 27, 2018

(54) HARVESTING HEADER TRANSPORT

(71) Applicant: HONEY BEE MANUFACTURING LTD., Frontier (CA)

(72) Inventor: Glenn Honey, Bracken (CA)

(73) Assignee: HONEY BEE MANUFACTURING LTD., Frontier, SK (CA)

( * ) Notice: Subject to any disclaimer, the term of this patent is extended or adjusted under 35 U.S.C. 154(b) by 0 days.

(21) Appl. No.: 14/742,447

(22) Filed: Jun. 17, 2015

(65) Prior Publication Data

US 2015/0282427 A1    Oct. 8, 2015

Related U.S. Application Data

(63) Continuation-in-part of application No. 14/143,023, filed on Dec. 30, 2013.

(51) Int. Cl.
  *A01D 75/00* (2006.01)
  *A01B 73/00* (2006.01)
  *B60P 3/06* (2006.01)

(52) U.S. Cl.
  CPC .......... *A01D 75/002* (2013.01); *A01B 73/005* (2013.01); *B60P 3/066* (2013.01)

(58) Field of Classification Search
  CPC ..... A01D 75/002; A01D 73/005; B60P 3/066; B62D 63/06; B62D 63/061
  USPC ................................ 56/228, 473.5; 280/404
  See application file for complete search history.

(56) References Cited

U.S. PATENT DOCUMENTS

| | | |
|---|---|---|
| 12,750 A | 4/1855 | Chatfield |
| 524,215 A | 8/1894 | Quigley |
| 2,271,808 A | 2/1942 | Starkey |
| 2,413,072 A | 12/1946 | Sage |
| 2,694,894 A | 11/1954 | Linscheld |
| 3,468,109 A | 9/1969 | Reimer |
| 3,472,008 A | 10/1969 | Hurlburt |
| 3,550,366 A | 12/1970 | Gibson |
| 3,702,661 A | 11/1972 | Berry, Jr. |
| 3,771,299 A | 11/1973 | Gradwohl et al. |
| 3,927,512 A | 12/1975 | Molzahn |
| 3,945,180 A | 3/1976 | Sinclair |
| 4,038,810 A | 8/1977 | Williams et al. |
| 4,067,177 A | 1/1978 | Tout |
| 4,120,137 A | 10/1978 | Schoenberger et al. |
| 4,127,981 A | 12/1978 | Parrish et al. |
| 4,137,696 A | 2/1979 | Webb |

(Continued)

FOREIGN PATENT DOCUMENTS

| | | |
|---|---|---|
| CA | 1003310 | 1/1977 |
| CA | 1040438 | 10/1978 |

(Continued)

*Primary Examiner* — Kevin Hurley
*Assistant Examiner* — Felicia L Brittman

(57) ABSTRACT

An apparatus is disclosed. The apparatus includes a harvesting header; a harvesting header carrier; at least one retractor and at least one tension link coupled to the at least one retractor, said at least one retractor and said at least one tension link connected to the harvesting header and the harvesting header carrier; wherein the at least one retractor is operable to retract the at least one tension link to shorten the at least one tension link and cause the harvesting header carrier to be lifted towards and engage with the harvesting header. Further apparatuses, systems and methods are also disclosed.

17 Claims, 11 Drawing Sheets

(56) References Cited

U.S. PATENT DOCUMENTS

| | | | |
|---|---|---|---|
| 4,156,340 A | 5/1979 | Colgan et al. | |
| 4,174,602 A | 11/1979 | Webb et al. | |
| 4,177,625 A | 12/1979 | Knight et al. | |
| 4,187,664 A | 2/1980 | Meek et al. | |
| 4,202,154 A | 5/1980 | Waldrop et al. | |
| 4,270,338 A | 6/1981 | Halls | |
| 4,346,909 A | 8/1982 | Hundeby | |
| 4,353,201 A | 10/1982 | Pierce et al. | |
| 4,385,483 A * | 5/1983 | McIlwain | A01D 75/002 56/15.2 |
| 4,435,948 A | 3/1984 | Jennings | |
| 4,512,140 A | 4/1985 | Blakeslee | |
| 4,519,190 A | 5/1985 | Blakeslee | |
| 4,522,018 A | 6/1985 | Blakeslee | |
| 4,541,229 A | 9/1985 | Elijah | |
| 4,573,309 A | 3/1986 | Patterson | |
| 4,612,757 A | 9/1986 | Halls et al. | |
| 4,637,201 A | 1/1987 | Pruitt et al. | |
| 4,641,490 A | 2/1987 | Wynn et al. | |
| 4,660,361 A | 4/1987 | Remillard et al. | |
| 4,662,161 A | 5/1987 | Patterson | |
| 4,751,809 A | 6/1988 | Fox et al. | |
| 4,776,155 A | 10/1988 | Fox et al. | |
| 4,833,869 A | 5/1989 | Klein | |
| 4,909,026 A | 3/1990 | Molzahn et al. | |
| 4,936,082 A | 6/1990 | Majkrzak | |
| 4,956,966 A | 9/1990 | Patterson | |
| 4,988,115 A | 1/1991 | Steinke | |
| 5,005,343 A | 4/1991 | Patterson | |
| 5,007,235 A | 4/1991 | Nickel et al. | |
| 5,086,613 A | 2/1992 | Fox et al. | |
| 5,157,905 A | 10/1992 | Talbot et al. | |
| 5,243,810 A | 9/1993 | Fox et al. | |
| 5,261,290 A | 11/1993 | Ramsay et al. | |
| 5,333,904 A | 8/1994 | Kuhns | |
| 5,359,839 A | 11/1994 | Parsons et al. | |
| 5,435,239 A | 7/1995 | Talbot | |
| 5,459,986 A | 10/1995 | Talbot et al. | |
| 5,473,872 A | 12/1995 | Fox et al. | |
| 5,595,053 A | 1/1997 | Jasper et al. | |
| RE35,543 E | 7/1997 | Patterson | |
| 5,678,398 A | 10/1997 | Fox et al. | |
| 5,681,117 A | 10/1997 | Wellman et al. | |
| 5,768,870 A | 6/1998 | Talbot et al. | |
| 5,791,128 A | 8/1998 | Rogalsky | |
| 5,927,606 A | 7/1999 | Patterson | |
| 5,970,695 A * | 10/1999 | Dunn | A01B 73/005 172/311 |
| 5,992,759 A | 11/1999 | Patterson | |
| 6,029,429 A | 2/2000 | Fox et al. | |
| 6,044,636 A | 4/2000 | Minnaert | |
| 6,047,989 A | 4/2000 | Wood | |
| 6,079,194 A | 6/2000 | Waldrop | |
| 6,170,244 B1 | 1/2001 | Coers et al. | |
| 6,195,972 B1 | 3/2001 | Talbot et al. | |
| 6,199,358 B1 | 3/2001 | Majkrzak | |
| 6,209,297 B1 * | 4/2001 | Yeomans | A01B 73/005 56/14.9 |
| 6,282,876 B1 | 9/2001 | Patterson | |
| 6,324,823 B1 | 12/2001 | Remillard | |
| 6,351,931 B1 | 3/2002 | Shearer | |
| 6,397,573 B2 | 6/2002 | Majkrzak | |
| 6,428,047 B1 | 8/2002 | Kaderabek | |
| 6,442,918 B1 | 9/2002 | Fox | |
| 6,453,655 B2 | 9/2002 | Ferraris | |
| 6,502,379 B1 | 1/2003 | Snider | |
| 6,519,923 B1 | 2/2003 | Cooksey et al. | |
| 6,530,202 B1 | 3/2003 | Guyer | |
| 6,543,211 B1 | 4/2003 | Talbot | |
| 6,591,598 B2 | 7/2003 | Remillard et al. | |
| 6,675,568 B2 | 1/2004 | Patterson et al. | |
| 6,698,175 B1 | 3/2004 | Schumacher et al. | |
| 6,708,475 B2 | 3/2004 | Guyer | |
| 6,817,166 B2 | 11/2004 | Dunn | |
| 6,843,045 B2 | 1/2005 | Bickel | |
| 6,854,251 B2 | 2/2005 | Snider | |
| 6,865,871 B2 | 3/2005 | Patterson et al. | |
| 6,889,492 B1 | 5/2005 | Polk et al. | |
| 6,962,040 B2 | 11/2005 | Talbot | |
| 7,077,220 B2 | 7/2006 | Dunn et al. | |
| 7,131,253 B2 | 11/2006 | Remillard et al. | |
| 7,159,687 B2 | 1/2007 | Dunn et al. | |
| 7,188,461 B2 | 3/2007 | Fox et al. | |
| 7,197,865 B1 | 4/2007 | Enns et al. | |
| 7,306,062 B2 | 12/2007 | Dunn | |
| 7,306,252 B2 | 12/2007 | Barnett | |
| 7,308,947 B2 | 12/2007 | Barnett | |
| 7,322,175 B2 | 1/2008 | Ferre et al. | |
| 7,328,565 B2 | 2/2008 | Snider et al. | |
| 7,340,876 B1 | 3/2008 | Barnett | |
| 7,347,277 B2 | 3/2008 | Enns et al. | |
| 7,356,982 B2 | 4/2008 | Barnett | |
| 7,364,181 B2 | 4/2008 | Patterson | |
| 7,373,769 B2 | 5/2008 | Talbot et al. | |
| 7,392,124 B2 | 6/2008 | MacGregor et al. | |
| 7,392,646 B2 | 7/2008 | Patterson | |
| 7,438,305 B2 | 10/2008 | Schulz | |
| 7,444,798 B2 | 11/2008 | Patterson et al. | |
| 7,454,888 B2 | 11/2008 | Barnett | |
| 7,461,498 B1 | 12/2008 | Barnett | |
| 7,467,505 B2 | 12/2008 | MacGregor | |
| 7,472,533 B2 | 1/2009 | Talbot et al. | |
| 7,484,349 B2 | 2/2009 | Talbot et al. | |
| 7,497,069 B2 | 3/2009 | Enns et al. | |
| 7,647,755 B2 | 1/2010 | Barnett et al. | |
| 7,721,830 B2 | 5/2010 | Dunn et al. | |
| 7,730,707 B2 | 6/2010 | Pietricola et al. | |
| 7,849,952 B2 | 12/2010 | MacGregor et al. | |
| 7,856,801 B2 | 12/2010 | Remillard | |
| 7,918,076 B2 | 4/2011 | Talbot | |
| 7,958,706 B2 | 6/2011 | Remillard et al. | |
| 8,006,469 B2 | 8/2011 | Barnett | |
| 8,015,784 B2 | 9/2011 | Barnett et al. | |
| 8,020,363 B1 | 9/2011 | Barnett et al. | |
| 8,020,648 B2 | 9/2011 | Otto | |
| 8,056,311 B1 | 11/2011 | Barnett | |
| 8,069,640 B2 | 12/2011 | Barnett et al. | |
| 8,096,102 B2 | 1/2012 | Smith | |
| 8,117,812 B2 | 2/2012 | Patterson | |
| 8,161,719 B2 | 4/2012 | Barnett et al. | |
| 8,176,716 B2 | 5/2012 | Coers et al. | |
| 8,225,589 B2 | 7/2012 | Barnett | |
| 8,225,903 B2 | 7/2012 | Dunn | |
| 8,240,114 B2 | 8/2012 | Barnett | |
| 8,245,489 B2 | 8/2012 | Talbot | |
| 8,286,411 B2 | 10/2012 | Barnett et al. | |
| 8,286,412 B2 | 10/2012 | Kidd et al. | |
| 8,291,684 B2 | 10/2012 | Remillard et al. | |
| 8,291,686 B1 | 10/2012 | Cormier et al. | |
| 8,307,620 B1 | 11/2012 | Barnett et al. | |
| 8,341,927 B2 | 1/2013 | Barnett | |
| 8,387,351 B2 | 3/2013 | Guyer | |
| 8,402,728 B2 | 3/2013 | Kidd | |
| 8,408,567 B2 | 4/2013 | Bergman et al. | |
| 8,434,290 B2 | 5/2013 | Barnett et al. | |
| 8,468,789 B2 | 6/2013 | Barnett et al. | |
| 8,484,938 B2 | 7/2013 | Cormier et al. | |
| 8,484,939 B1 | 7/2013 | Cormier et al. | |
| 8,511,050 B1 | 8/2013 | Cormier et al. | |
| 8,590,284 B2 | 11/2013 | Rayfield | |
| 2003/0031524 A1 | 2/2003 | Brunet | |
| 2008/0086999 A1 * | 4/2008 | Tippery | A01B 73/005 56/228 |
| 2009/0056296 A1 * | 3/2009 | Patterson | A01D 75/002 56/228 |
| 2009/0189382 A1 | 7/2009 | Nubel et al. | |
| 2010/0052289 A1 | 3/2010 | Frey et al. | |
| 2011/0176882 A1 | 7/2011 | Bergen et al. | |
| 2012/0251653 A1 | 10/2012 | Mathy, Jr. et al. | |
| 2012/0260870 A1 | 10/2012 | Wahl et al. | |
| 2013/0036860 A1 | 2/2013 | Corniani | |
| 2014/0001726 A1 | 1/2014 | Statz | |
| 2014/0033940 A1 | 2/2014 | Simpson et al. | |
| 2014/0150601 A1 | 6/2014 | McGrath | |

(56) References Cited

U.S. PATENT DOCUMENTS

FOREIGN PATENT DOCUMENTS

| | | |
|---|---|---|
| CA | 1043577 | 12/1978 |
| CA | 2180627 | 1/1980 |
| CA | 1086508 | 9/1980 |
| CA | 1087402 | 10/1980 |
| CA | 1185438 | 4/1985 |
| CA | 1197694 | 12/1985 |
| CA | 1318135 | 5/1993 |
| CA | 2100204 | 1/1995 |
| CA | 2126909 | 1/1995 |
| CA | 2138939 | 6/1996 |
| CA | 2165735 | 6/1997 |
| CA | 2180625 | 1/1998 |
| CA | 2180626 | 1/1998 |
| CA | 2211363 | 1/1998 |
| CA | 2198672 | 8/1998 |
| CA | 2226200 | 11/1998 |
| CA | 2229152 | 8/1999 |
| CA | 2245213 | 2/2000 |
| CA | 2280681 | 2/2000 |
| CA | 2184278 | 8/2000 |
| CA | 2289164 | 10/2000 |
| CA | 2289171 | 10/2000 |
| CA | 2284432 | 4/2001 |
| CA | 2284436 | 4/2001 |
| CA | 2320379 | 5/2001 |
| CA | 2307176 | 10/2001 |
| CA | 2311019 | 12/2001 |
| CA | 2320524 | 3/2002 |
| CA | 2357825 | 9/2002 |
| CA | 2380557 | 10/2002 |
| CA | 2387898 | 12/2002 |
| CA | 2358883 | 4/2003 |
| CA | 2359598 | 4/2003 |
| CA | 2370891 | 4/2003 |
| CA | 2399234 | 6/2003 |
| CA | 2389513 | 12/2003 |
| CA | 2406416 | 4/2004 |
| CA | 2406419 | 4/2004 |
| CA | 2427755 | 11/2004 |
| CA | 2461790 | 11/2004 |
| CA | 2467595 | 12/2004 |
| CA | 2434981 | 1/2005 |
| CA | 2510883 | 12/2005 |
| CA | 2513037 | 2/2006 |
| CA | 2341283 | 3/2006 |
| CA | 2494395 | 6/2006 |
| CA | 2494034 | 7/2006 |
| CA | 2505431 | 9/2006 |
| CA | 2505458 | 9/2006 |
| CA | 2531189 | 9/2006 |
| CA | 2513605 | 1/2007 |
| CA | 2513614 | 1/2007 |
| CA | 2528731 | 1/2007 |
| CA | 2743336 | 1/2007 |
| CA | 2521187 | 3/2007 |
| CA | 2522387 | 4/2007 |
| CA | 2524151 | 4/2007 |
| CA | 2525904 | 5/2007 |
| CA | 2527797 | 5/2007 |
| CA | 2534200 | 6/2007 |
| CA | 2538020 | 8/2007 |
| CA | 2554689 | 1/2008 |
| CA | 2596403 | 2/2008 |
| CA | 2559217 | 3/2008 |
| CA | 2559353 | 3/2008 |
| CA | 2561463 | 3/2008 |
| CA | 2609744 | 5/2008 |
| CA | 2627320 | 9/2008 |
| CA | 2626486 | 2/2009 |
| CA | 2639032 | 3/2009 |
| CA | 2783567 | 3/2009 |
| CA | 2587107 | 7/2009 |
| CA | 2627053 | 9/2009 |
| CA | 2578907 | 4/2010 |
| CA | 2671880 | 4/2010 |
| CA | 2564777 | 8/2010 |
| CA | 2695689 | 9/2010 |
| CA | 2665580 | 11/2010 |
| CA | 2665589 | 11/2010 |
| CA | 2706704 | 1/2011 |
| CA | 2706705 | 1/2011 |
| CA | 2706706 | 1/2011 |
| CA | 2706707 | 1/2011 |
| CA | 2775891 | 1/2011 |
| CA | 2783670 | 1/2011 |
| CA | 2713636 | 2/2011 |
| CA | 2596627 | 4/2011 |
| CA | 2686017 | 5/2011 |
| CA | 2721118 | 5/2011 |
| CA | 2739632 | 11/2011 |
| CA | 2708744 | 12/2011 |
| CA | 2745105 | 12/2011 |
| CA | 2538489 | 1/2012 |
| CA | 2707624 | 1/2012 |
| CA | 2709336 | 1/2012 |
| CA | 2710676 | 2/2012 |
| CA | 2734475 | 5/2012 |
| CA | 2766611 | 7/2012 |
| CA | 2744070 | 12/2012 |
| CA | 2802894 | 1/2013 |
| CA | 2796109 | 5/2013 |
| CA | 2796120 | 5/2013 |
| CA | 2796131 | 5/2013 |
| CA | 2796134 | 5/2013 |
| CA | 2796177 | 5/2013 |
| CA | 2796165 | 6/2013 |
| CA | 2802958 | 7/2013 |
| CA | 2802963 | 7/2013 |
| CA | 2802972 | 7/2013 |
| CA | 2802975 | 7/2013 |
| CA | 2803470 | 7/2013 |
| CA | 2814924 | 10/2013 |
| CA | 2815395 | 10/2013 |
| CA | 2815408 | 10/2013 |
| CA | 2815421 | 10/2013 |
| CA | 2815427 | 10/2013 |
| EP | 1935226 | 6/2008 |
| WO | 2012/166629 | 12/2012 |

\* cited by examiner

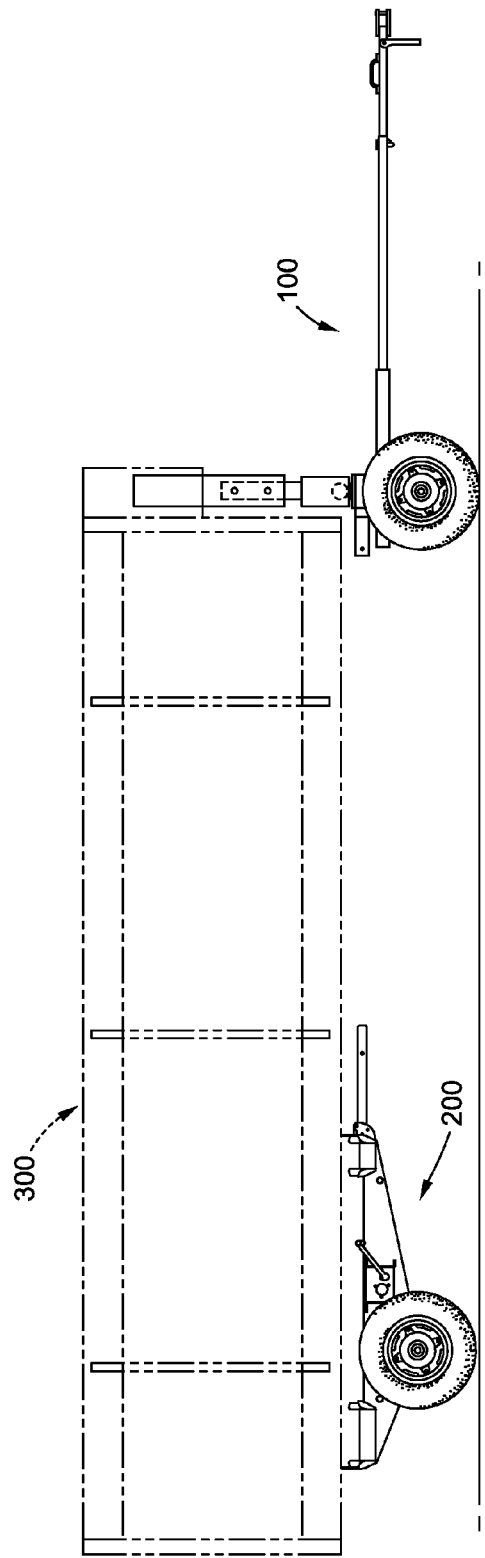
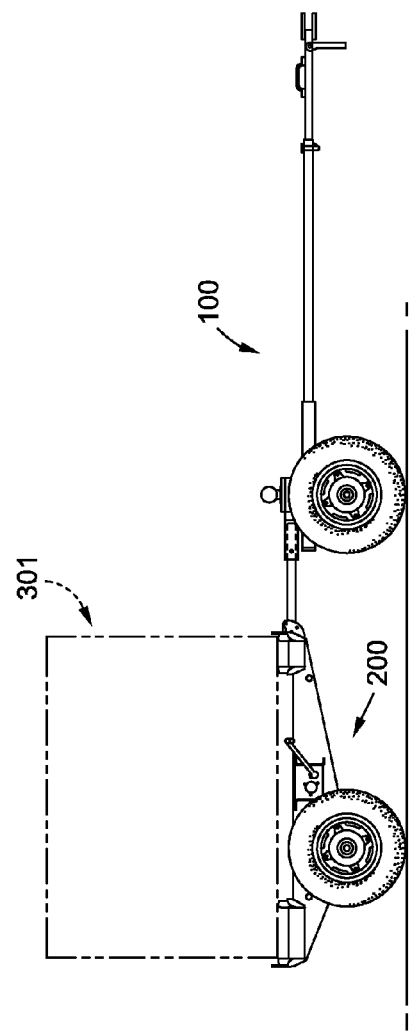

HARVESTING HEADER TRANSPORT

CROSS-REFERENCE TO RELATED APPLICATIONS

This application is a continuation-in-part of U.S. application Ser. No. 14/143,023, filed Dec. 30, 2013, which is hereby incorporated by reference in its entirety.

FIELD

This invention is in the field of mechanical devices for transporting farm equipment. In particular, the invention relates to devices that are useful in transporting a harvesting header assembly.

BACKGROUND

For the last century, the general trend in agriculture has been the consolidation of farmland into larger and larger farming operations. In 1900 the average farm size in the U.S. was about 140 acres. Today the average size is over 400. Because of the way in which farmlands were originally surveyed and parceled and the way in which land is acquired, large farms generally do not consist of contiguous plots of land. As a result, in order to manage a farm, farm equipment frequently must be moved from one site to another using public roadways.

For some self-propelled equipment this presents little problem. However, other types of farm equipment, for example combines with harvesting headers, cannot simply be driven down the road as the header portion is generally too wide to be accommodated by public roadways. Headers can be as much as 40 feet in width (about 12 m). The standard lane width in North America is about 12 feet (3.7 m). Thus, transporting a harvesting header while installed on the combine can be virtually impossible, as it would completely tie up traffic in both directions on most single lane roads, the routes typically available from field to field.

As a result, the header on a combine generally has to be removed from the combine, loaded onto a trailer lengthwise so that it can be safely transported to the next field where combining operations are to take place. A variety of solutions have generally taken the approach of removing the header and placing the header lengthwise on a trailer, the header and trailer being narrow enough to fit safely within a single lane of a roadway.

For example, U.S. Pat. No. 5,333,904 (Kuhns) discloses a trailer with supporting brackets onto which a harvesting header can be loaded and secured. The header is placed such that it is aligned longitudinally with the trailer, thereby allowing the header to be safely transported on public roadways. However, this system cannot conveniently be manipulated by a single operator since the header is placed onto the trailer. For example, a single operator may not be able to see under the header to align the header with the trailer and may need to use an additional person as a spotter. This type of loading may require skill and may not be easy to accomplish. Further, the system described in Kuhns is not readily adaptable to a variety of harvesting header configurations since brackets are used as support members. For example, combine headers which are of the flex type may not have a consistent structure on the bottom side of the frame which may make it difficult to load such headers onto a generic bracket and so specialty brackets may be required, with the type of required bracket unique between headers.

Later approaches to the problem include those such as are disclosed in U.S. Pat. No. 6,047,989 (Wood). Wood describes adjustable header support units that are configured to be more readily adapted to various header units. Wood, however, describes simply adding a plurality of mounting points for the supporting brackets, such that the user can select a particular bracket mount point to more or less align with the desired engagement point on the header. Given its size, the system described in Wood is still not particularly amenable to use by a single operator and still retains defined attachment points, which may or may not perfectly align with sites on the header to which one might wish to secure the header to the trailer.

Others have described trailers that allow the header to be rotated around the longitudinal axis in order to save space and make it easier to effect repairs. For example, U.S. Pat. No. 6,428,047 (Kaderabek) discloses a trailer that allows the header to be placed on the trailer and then pivotally rotated in order to either provide access to the underside of the header, or to save space for storage of the header in the off-season. A variation of this same theme is disclosed in U.S. Patent Publication No. 2009/0189382 (Nubel et al.). Still others have disclosed a trailer with a steerable wheel system on which headers can be transported, as is disclosed in U.S. Patent Publication No. 2010/0052289 (Frey et al.).

The above described devices suffer from limitations. For example, by using a fixed size trailer, a system may not be easily adapted for headers of difference sizes. Some of the above described systems are effectively large trailers that are difficult for a single operator to manipulate. Using the equipment described above may require two or three people in order to situate the trailer and move the header from the combine to the trailer.

SUMMARY

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

An illustrative embodiment of the invention comprises front and rear carriers that can be attached to the bottom plane the combine header. When secured in place, these front and rear carriers cooperatively can bear the weight of the header during transport. The front carrier is designed to include a steerable wheel assembly to make trailing the carriers and header behind a towing vehicle easier. The rear carrier includes an extendable strap system connected to a winch. The straps can be secured to the structure of the header and once in place the winch can be operated to attract or retract the straps lifting the rear carrier into place underneath the header. The front carrier includes a header support structure that connects the front end of the header to the front carrier wheel assembly thus supporting the other end of the header.

An illustrative embodiment of the invention includes a method of installing and securing the front and rear carrier support systems to the header, and then once in place connecting the combined components to a towing vehicle for transport of the header to a desired location. The wheel assemblies are designed such that the wheels will be oriented substantially parallel to the longitudinal axis of the header so that the header can be easily towed lengthwise down a standard roadway.

Thus, an embodiment of the invention includes a system for road transport of a harvesting header, said header including a front end proximate to and representing the front of the header when oriented for towing in transport mode and a back end at the opposing end of the header from the front end, the system comprising: a front carrier support connected to the bottom plane of the header at or near the front end of the header; a front carrier comprising a steerable front wheel assembly with a towing member and hitch attached thereto, said front carrier adapted to attachably engage the front header support to attach the front carrier to the header; a rear carrier comprising: a rear carrier frame which can be attached to the bottom plane of the header in a rear carrier support zone by header connectors thereon; at least one rear wheel assembly attached to the rear carrier frame such that the at least one rear wheel assembly is oriented in the direction of transport of the header when the rear carrier frame is attached to the rear carrier support zone; more than one extendable header strap attached thereto, each header strap having a header hook on the distal end thereof which can be connected to the header in the rear carrier support zone wherein when the rear carrier is placed on the ground beneath the header in a raised position and the extended header straps are secured to the header using their header hooks, by retracting those header straps from their extended positions the rear carrier is lifted into position in the rear carrier support zone on the bottom plane of the header, where the rear carrier can be connected to the header by the header connectors; and wherein the front carrier can be attached to the header by placement of the front carrier on the ground below the header with the rear carrier attached thereto, in alignment with the front carrier support, and the header is lowered to align and attach the front carrier to the front carrier support; wherein upon attachment of the header to the front carrier and rear carrier, the combined unit is trailable behind a power unit hitched thereto.

In some embodiments, the header straps are connected to a winch on the rear carrier frame, whereby operation of the winch will result in the extension or retraction of the header straps.

In some embodiments, the front header support comprises a plurality of members adapted to be telescoped within one another, and locking means to restrict movement of said members once the header support has a desired length.

In some embodiments, the rear carrier frame further comprises strap guides, the strap guides configured to bear a portion of the tension applied to the header straps when the winch is operated.

In some embodiments, the winch further comprises a motor, said motor effective to power the extension or retraction of the header straps. In some embodiments, the straps further comprise means to reversibly secure the strap to the header. In some embodiments, the means to reversibly secure the header strap to the header comprise at least one of a hook, and a snap.

An illustrative embodiment of the invention further provides a method of transporting a harvesting header, said header including a front end proximate to and representing the front of the header when oriented for towing in transport mode and a back end at the opposing end of the header from the front end, the method comprising: providing a header to be transported, wherein the header is elevated above the ground surface, said header including a front carrier support connected to the bottom plane of the header at or near the front end, wherein the bottom plane of the header at or near the back end thereof comprises a rear carrier support zone; positioning a rear carrier on the ground beneath the rear carrier support zone of the header, said rear carrier comprising: a rear carrier frame which can be attached to the bottom plane of the header in the rear carrier support zone by header connectors thereon; at least one rear wheel assembly attached to the rear carrier frame such that the at least one rear wheel assembly is oriented in the direction of transport of the header when the rear carrier frame is attached to the rear carrier support zone; more than one extendable header strap attached thereto, each header strap having a header hook on the distal end thereof which can be connected to the header in the rear carrier support zone; extending the extendable header straps so that the extended header straps can reach attachment points on the header beneath the rear carrier support zone where the header hooks are attached; retracting the header straps, lifting the rear carrier into position in the rear carrier support zone on the bottom plane of the header, where the rear carrier can be connected to the header by the header connectors; placing a front carrier on the ground below the front end of the header, in alignment with the front carrier support, said front carrier comprising a steerable front wheel assembly with a towing member and hitch attached thereto, and adapted to attachably engage the front header support to attach the front carrier to the header; lowering the header to align and attach the front carrier to the front carrier support; wherein upon attachment of the header to the front carrier and rear carrier, the combined unit is trailable behind a power unit hitched thereto.

In some embodiments of the method, the front carrier support further comprises a plurality of members adapted to be telescoped within one another, and locking means to restrict movement of said members once the front carrier support has been telescoped to a desired length.

In some embodiments of the method, the header is secured to the front carrier before the rear carrier. In some embodiments of the method, the header is secured to the rear carrier before the front carrier.

In some embodiments of the method, the rear carrier further comprises a winch on the rear carrier frame, attached to the header straps, whereby operation of the winch will result in the extension or retraction of the header straps.

In some embodiments of the method, once the front and rear carriers are secured to the header, the header is lowered until substantially all the weight of the header is borne by the front and rear carriers acting cooperatively. In some embodiments, the method further comprises disconnecting the header from the combine once substantially all the weight of the header is borne by the front and rear carriers.

An illustrative embodiment of the invention provides a transport system for transport of a harvesting header that comprises separate front and rear carriers in a configuration that permits a single person to prepare a harvesting header for transport. The wheeled front carrier engages a support member attached to one end of the harvesting header and includes a towing member and means of connecting the front carrier to a towing vehicle. A wheeled rear carrier comprises deployable straps that can be attached to the harvesting header. A winch applies tension to the straps and on retraction pulls the rear carrier up and into position underneath the header. The harvesting header is then lowered to transfer the weight to the carriers and the header then disconnected from the combine, and is ready for transport.

An embodiment of the invention may provide a harvesting header transport system and accompanying method of use that may simplify the movement of a harvesting header from one site to another, and may be compatible with typically public roadways that are used to transport farm equipment from site to site. An embodiment of the invention provides a system and method that may be used by a single worker.

In one illustrative embodiment, there is provided an apparatus including a harvesting header, a harvesting header carrier, and at least one retractor and at least one tension link coupled to the at least one retractor, the at least one retractor and the at least one tension link connected to the harvesting header and the harvesting header carrier. The at least one retractor is operable to retract the at least one tension link to shorten the at least one tension link and cause the harvesting header carrier to be lifted towards and engage with the harvesting header.

In another illustrative embodiment, there is provided a method of preparing a harvesting header for transport by a harvesting header carrier, including connecting at least one tension link and at least one retractor coupled to the at least one tension link to the harvesting header or the harvesting header carrier to link the harvesting header and the harvesting header carrier. The method also involves causing the at least one retractor to retract the at least one tension link to shorten the at least one tension link and cause the harvesting header to be lifted towards and engage with the harvesting header.

In another illustrative embodiment, there is provided a system for road transport of a harvesting header. The header includes a front end proximate to and representing the front of the header when oriented for towing in transport mode and a back end at the opposing end of the header from the front end. The system includes a front header support connected to the bottom plane of the header at or near the front end of the header, and a front carrier comprising a steerable front wheel assembly with a towing member and hitch attached thereto, the front carrier adapted to attachably engage the front header support to attach the front carrier to the header. The system also includes a rear carrier including a rear carrier frame which can be attached to the bottom plane of the header in a rear carrier support zone by header connectors thereon, at least one rear wheel assembly attached to the rear carrier frame such that the at least one rear wheel assembly is oriented in the direction of transport of the header when the rear carrier frame is attached to the rear carrier support zone, and more than one extendable header strap attached thereto, each header strap having a header strap connector configured to reversibly secure the header strap to the header on the distal end thereof which can be connected to the header in the rear carrier support zone. When the rear carrier is placed on the ground beneath the header in a raised position and the extended header straps are secured to the header using their header strap connectors, by retracting those header straps from their extended positions the rear carrier is lifted into position in the rear carrier support zone on the bottom plane of the header, where the rear carrier can be connected to the header by the header connectors. The front carrier can be attached to the header by placement of the front carrier on the ground below the header with the rear carrier attached thereto, in alignment with the front carrier support, and the header is lowered to align and attach the front carrier to the front carrier support. Upon attachment of the header to the front carrier and rear carrier, the combined unit is trailable behind a power unit hitched thereto.

In another illustrative embodiment, there is provided a method of transporting a harvesting header. The header includes a front end proximate to and representing the front of the header when oriented for towing in transport mode and a back end at the opposing end of the header from the front end. The method involves providing a header to be transported, wherein the header is elevated above the ground surface, the header including a front carrier support connected to the bottom plane of the header at or near the front end, wherein the bottom plane of the header at or near the back end thereof comprises a rear carrier support zone, and positioning a rear carrier on the ground beneath the rear carrier support zone of the header. The rear carrier includes a rear carrier frame which can be attached to the bottom plane of the header in the rear carrier support zone by header connectors thereon, at least one rear wheel assembly attached to the rear carrier frame such that the at least one rear wheel assembly is oriented in the direction of transport of the header when the rear carrier frame is attached to the rear carrier support zone, and more than one extendable header strap attached thereto, each header strap having a header hook on the distal end thereof which can be connected to the header in the rear carrier support zone. The method also involves extending the extendable header straps so that the extended header straps can reach attachment points on the header beneath the rear carrier support zone where the header hooks are attached, and retracting the header straps, lifting the rear carrier into position in the rear carrier support zone on the bottom plane of the header, where the rear carrier can be connected to the header by the header connectors. The method also involves placing a front carrier on the ground below the front end of the header, in alignment with the front carrier support, the front carrier comprising a steerable front wheel assembly with a towing member and hitch attached thereto, and adapted to attachably engage the front header support to attach the front carrier to the header, and lowering the header to align and attach the front carrier to the front carrier support. Upon attachment of the header to the front carrier and rear carrier, the combined unit is trailable behind a power unit hitched thereto.

In another illustrative embodiment, there is provided an apparatus including a harvesting header, a harvesting header carrier, and a position adjustment mechanism operable to lift the harvesting header carrier off a support surface into engagement with the harvesting header.

In another illustrative embodiment, there is provided an apparatus for supporting a harvesting header for transportation, including a first harvesting header carrier operable to support the harvesting header at a first location, the first harvesting header carrier including at least one connector operable to removably connect to the harvesting header, and a second harvesting header carrier operable to support the harvesting header at a second location spaced apart from the first location, the second harvesting header carrier including at least one connector operable to removably connect to the harvesting header. The first harvesting header carrier includes a carrier connector operable to removably connect to the second harvesting header carrier when the first and second harvesting header carriers are not connected to the harvesting header.

In another illustrative embodiment, there is provided an apparatus including at least one flexible elongate support, at least one header connector and at least one carrier connector coupled to the at least one flexible elongate support and operable to connect to a harvesting header and a harvesting header carrier respectively to link the harvesting header and the harvesting header carrier, and at least one retractor coupled to the at least one flexible elongate support and operable to retract the at least one flexible elongate support when the at least one header connector and the at least one carrier connector are connected to the harvesting header and the harvesting header carrier respectively to shorten the at least one flexible elongate support and cause the harvesting header carrier to be lifted towards and engage with the harvesting header.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numerals, and where:

FIGS. 1A and 1B are side views of embodiments of the present invention;

DETAILED DESCRIPTION

As discussed above, transport systems for harvesting headers may have several limitations. In some instances the systems require several people in order to position and load the header onto a trailer or other transport means. Still other systems are not readily adaptable to headers of different sizes. Embodiments of the present invention may solve a number of these issues and may provide a substantially universally adaptable transport system for harvesting headers and other difficult to transport farm equipment. Significantly, a single user may be able to effectively employ embodiments of the present invention.

In the present specification, the term "end" as it relates to the harvesting header is taken to refer to any position between the center of balance of the header and the physical end of the header. The term therefore should not be taken to strictly mean the absolute end of the harvesting header. As a result, when referring below to placement of the front and rear carriers with respect to an "end" of the harvesting header, what is meant is that the front carrier can be positioned at some location away from the center of balance toward, and including a physical end of the harvesting header, and the rear carrier will be positioned at some location on the other side of the center of balance and toward or at the opposite physical end of the harvesting header.

The invention comprises in some embodiments a front carrier 100 and rear carrier 200 that are configured to accept a harvesting header 300 for transport, as depicted in FIGS. 1A and 1B. As shown, the harvesting header 300 is supported by the front and rear carriers 100 and 200 in such a way that the header can be transported lengthwise along a standard roadway. Referring to the remaining figures, additional detail regarding the construction and operation of embodiments of the invention will become apparent.

Figure 2A:
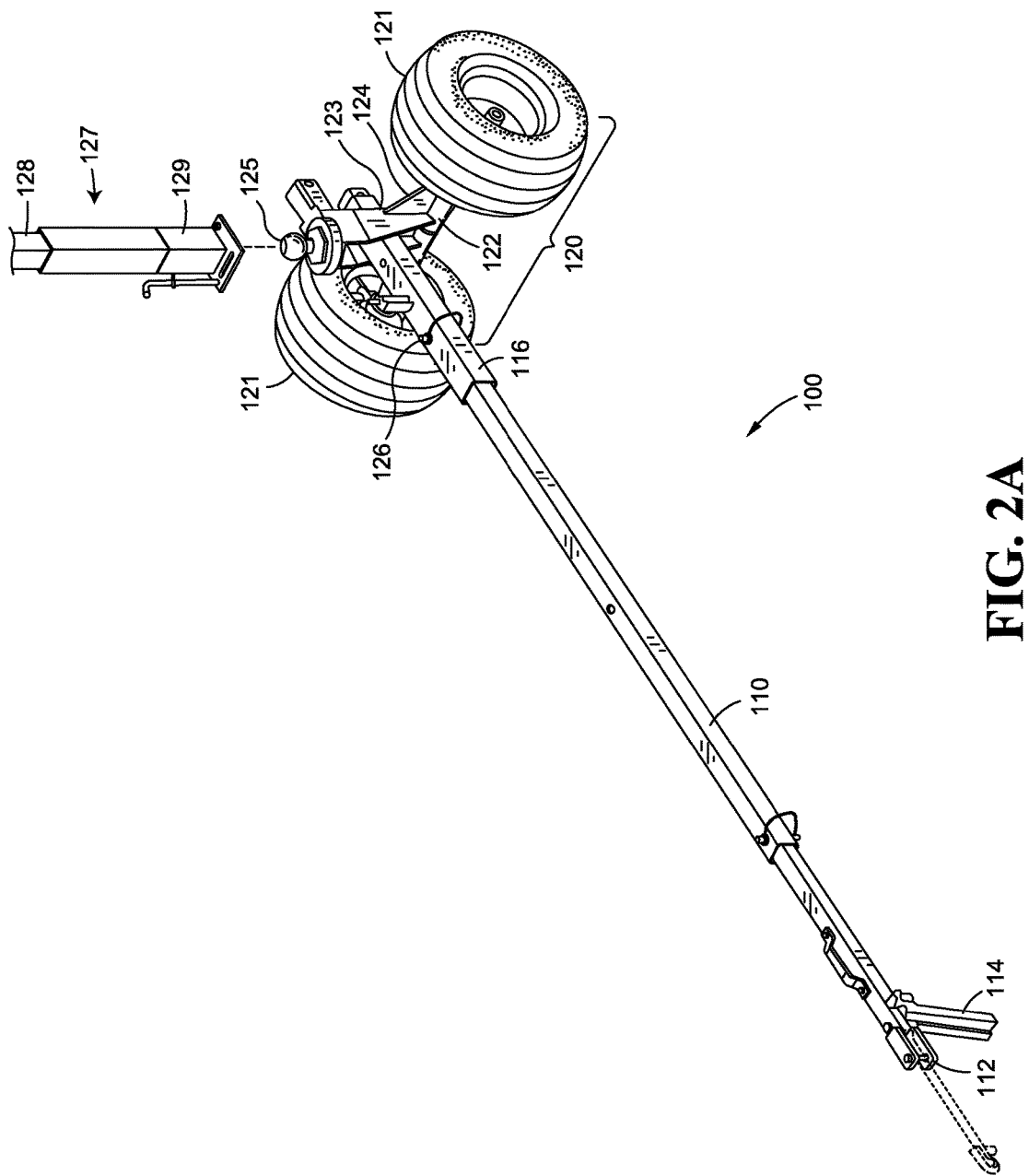
FIG. 2A is a perspective view of an embodiment of the front carrier part of the present invention.

FIG. 2A depicts the front carrier 100 in accordance with an embodiment of the invention. In one embodiment of the present invention, the front carrier 100 comprises a towing member 110 a front carrier wheel assembly 120 and a hitching means 112 that permits the towing member to be connected to a vehicle used for transporting a harvesting header. The front carrier wheel assembly 120 comprises wheels 121 connected to each other by an axle or axle assembly 122. In one embodiment, the front carrier wheel assembly 120 comprises two wheels, although additional wheels can be include in the assembly if desired to more effectively support or distribute the weight of the harvesting header supported by the front carrier 100. Wheels suitable for use with embodiments of the invention will be obvious to those of skill in the art, and generally typical pneumatic tires can be used. In addition, in some embodiments, the front wheel assembly 120 is configured such that the front wheel assembly portion can be steerable, thus simplifying towing and maneuvering of the combine header once it is secured to the support system as described herein.

The wheels 121 and axle assembly are connected to the towing member 110 via an axle mount 124. In some embodiments the axle mount 124 may be attached directly to the towing member 110. In other embodiments, as shown in FIG. 2A, the axle mount 124 can be attached to a towing member receiver 116 by a portion of the header support mount 123. In other embodiments, the axle 122 can be attached directly to the towing member receiver. The towing member receiver 116 can be configured to be reversibly attachable to the towing member 110. In some embodiments, providing a separate towing member receiver component may permit the towing member 110 to be removed from the wheel assembly 120, such as might be desired for storage thus minimizing the space required to store the various components.

Where a towing member receiver 116 is provided it can be secured to the towing member 110 by a fastener 126. Suitable fasteners can include nut and bolt combinations, locking pins, and other like components.

The front carrier 100 also comprises a structure designed to support one end of a harvesting header. In the embodiment illustrated in FIGS. 2A and 2B, the front carrier 100 includes a header support mount 123. The header support mount 123 is connected to the towing member 110, in some cases, by attaching to the towing member receiver 116. In some embodiments, the header support mount 123 can also be attached to the axle mount 124, which may provide for improved strength and rigidity. The header support mount 123 further includes a front connector 125 that is designed to receive an end of a header support 127. In some embodiments, the front connector 125 can be a typical ball hitch. One end of the header support 127 is designed to be attachable to a portion of the harvesting header, typically a part of the header frame superstructure, via a front header attachment 128. The front carrier 100 and associated support structures are generally designed to be attached to the bottom plane of the header, at or near the front end of the header, although in some embodiments it may be desirable to support the front end of the header by other means.

In some embodiments the front header support 127 can comprise a plurality of members that are adapted to be telescoped within one another. In some embodiments, a telescoping front header support can further include locking means to restrict the movement of the telescoping members once the header support has been extended or retracted to a desired length. In some embodiments, the front and/or rear carriers 100 and 200 as described herein may further include shock absorbing means in order to isolate the combine header from vibration experienced during transport.

The front header attachment 128 can comprise any kind of removable means of securing components, including nut and bolt combinations, locking pins, or a post which can be inserted into an end of the header support 127 or onto which an end of the header support 127 can be inserted. Where a post is used, it may also include a locking pin or like arrangement to prevent the header support 127 from sliding off the pinion during transport. Where a post is used, the components can be designed such that the header support 127 inserts into an appropriately sized hollow post, or vice versa.

Figure 2B:
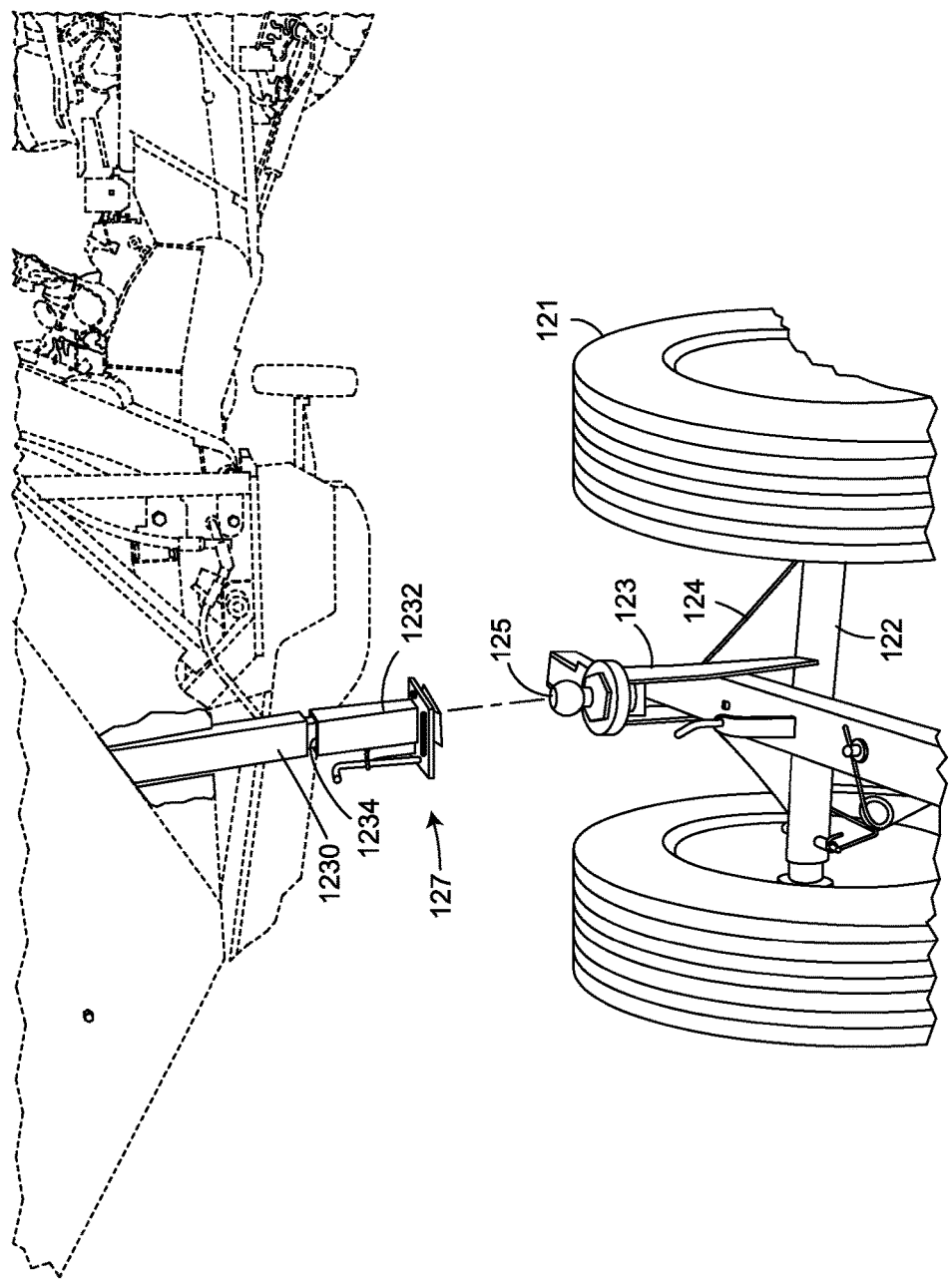
FIG. 2B is a perspective view of an embodiment of a front carrier and front header attachment with the header attachment secured to the header, and the front carrier ready to be secured to the header attachment.
Figure 2C:
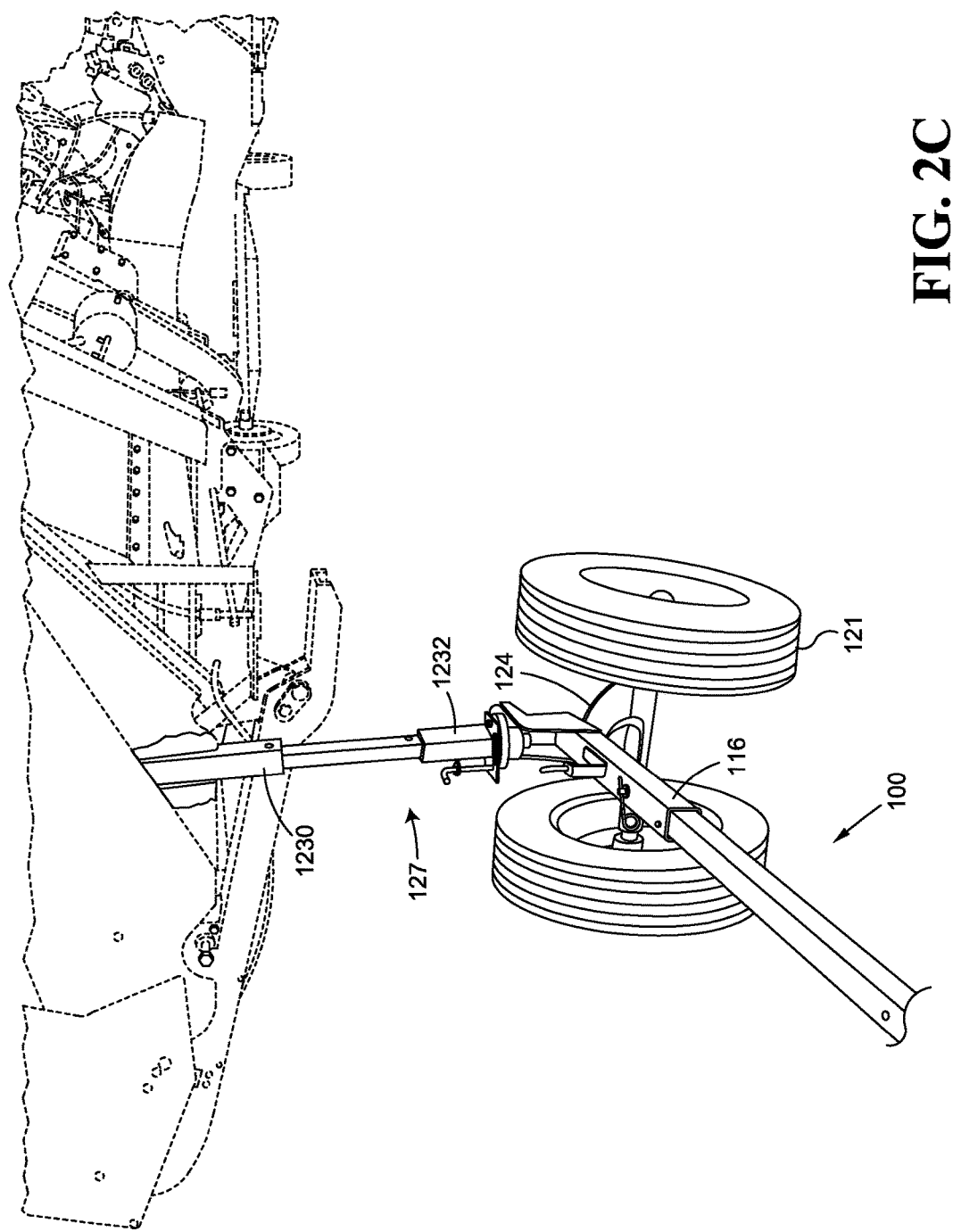
FIG. 2C is a perspective view of an embodiment of a front carrier of the present invention secured to a combiner header via the front header attachment.

The opposite end of the header support 127 is designed to engage the front connector 125. In some embodiments, the end of the header support 127 that engages the front connector can simply be a tube with an inside opening large enough to accept the connector, for example a ball hitch of a known diameter. As shown in FIGS. 2B and 2C, the header support 127 can comprise an upper member 1230 that attaches to the harvesting header, and which slidably engages a lower member 1232 which includes the portion that engages the front connector. In some embodiments, the upper member 1230 may be fixedly connected to the front header attachment and/or to the header. In some embodiments, the upper member 1230 may be welded to the header and may be considered as part of the header rather than as part of the header support 127.

In use, this allows the header support 127 to be attached to the harvesting header, and then the lower portion extended into position to engage the front connector 125. Then, when the harvesting header is ready to be lowered, the upper and lower members 1230 and 1232 simply slide relative to each other to effectively shorten the length of the header support member. The lower member can further include a flange 1234 that provides a stop that prevents further shortening of the header support 127 past a certain pre-determined length. FIGS. 2B and 2C depict the header support 127 in retracted and extended configurations, respectively. As can be easily appreciated with reference to FIG. 2C, as the combine header is lowered, the upper member 1230 will slide over the lower member 1232 until the upper member reaches the flange 1234, at which no further shortening will occur, and a portion of the weight of the harvesting header will be supported by the front carrier 100.

For improved security when transporting the harvesting header, a safety or safety device can be included to ensure that the header support 127 does not inadvertently disengage from the header support mount during transport. Safety devices may include chains, locking pins, or nut and bolt arrangements well known in the art.

In one embodiment, the invention further comprises a rear carrier 200 that in cooperation with the front carrier 100 is designed to support a harvesting header during transport and/or storage. In one embodiment, depicted in FIG. 3A, the rear carrier 200 comprises a frame 210 that serves as a support for components adapted to receive the harvesting header, and at least one rear wheel assembly 220 that is attached to the rear carrier. Attachment of the rear carrier frame 210 may be to the bottom plane of the header within a region termed the rear carrier support zone.

Analogous to the front carrier 100, the wheel assembly 220 comprises wheels 221 connected by an axle 222. In one embodiment, the rear carrier wheel assembly 220 comprises two wheels, however, as discussed above for the front carrier 100, more than two wheels may be desired in order to support heavier loads or to distribute the load being carried. For example, in some embodiments it is conceivable that an embodiment of the present invention could be designed to carry more than one harvesting header, with a second header "stacked" onto the first. In such embodiments, a more robust wheel assembly on both the front and rear carriers might be required. In some embodiments, the wheels 221 on the rear wheel assembly 220 will already be oriented in the desired direction of transport when the rear carrier frame 210 is attached to the header.

The rear carrier 200 includes a first support member or support 212 and second support member or support 213 connected to the frame 210, and which are configured to cooperate to support the harvesting header. In some embodiments, the first and second supports 212 and 213 may be operable to support an end of the harvesting header, opposite to that supported by the front carrier 100 shown in FIGS. 1A-B and 2A-C. The supports 212 and 213 are oriented generally perpendicular to the longitudinal axis of the rear carrier, although other configurations and placements than those shown in FIG. 3B can be employed without departing from the scope of embodiments of the invention.

The rear carrier 200 further comprises a position adjustment mechanism including a winch 230 acting as a retractor and an extendable header strap or tension link system designed to engage and, in some embodiments, secure the harvesting header to the rear carrier. As shown in the accompanying FIGS. 3A-3C, in one embodiment the winch 230 is situated on one side of the frame. In one embodiment, the winch 230 can be manually operated, in which case it will include a handle 231 to allow a user to operate the winch. The winch 230 can also include features such as a lock, which locks the winch in a position, and a release in order to disengage the lock. In some embodiments it may be desirable to provide a motorized winch rather than one that is operated manually, such as, for example, as shown in the embodiment-shown in FIG. 4. In such cases, the winch will include some form of power supply, for example, a battery as in the case of an electric motor, or some means of connecting the motor to an external power supply.

The drive mechanism of the winch 230 is connected to a winch axle 235, which passes through and is supported by members of the frame 210. The winch axle 235 engages the proximal end of one or more straps 240 acting as tension links or flexible elongate supports, the straps designed to reversibly or removably connect the harvesting header to the rear carrier 200. As can be appreciated, the winch 230 can be operated to permit the extension or retraction of the header straps depending on whether the user is securing or removing the rear carrier from the header.

Figure 3A:
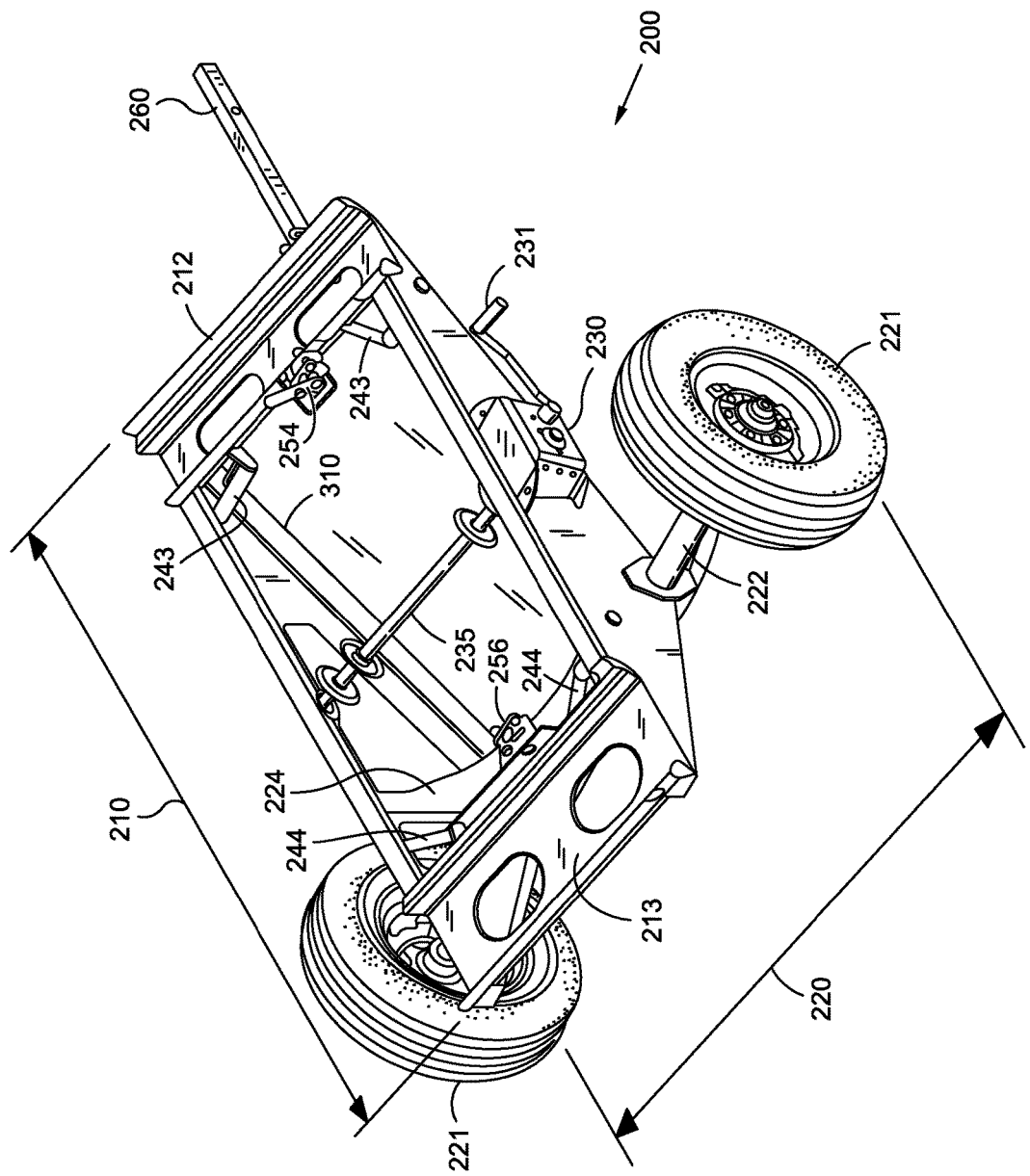
FIG. 3A is a perspective view of an embodiment of a rear carrier of the present invention.
Figure 3B:
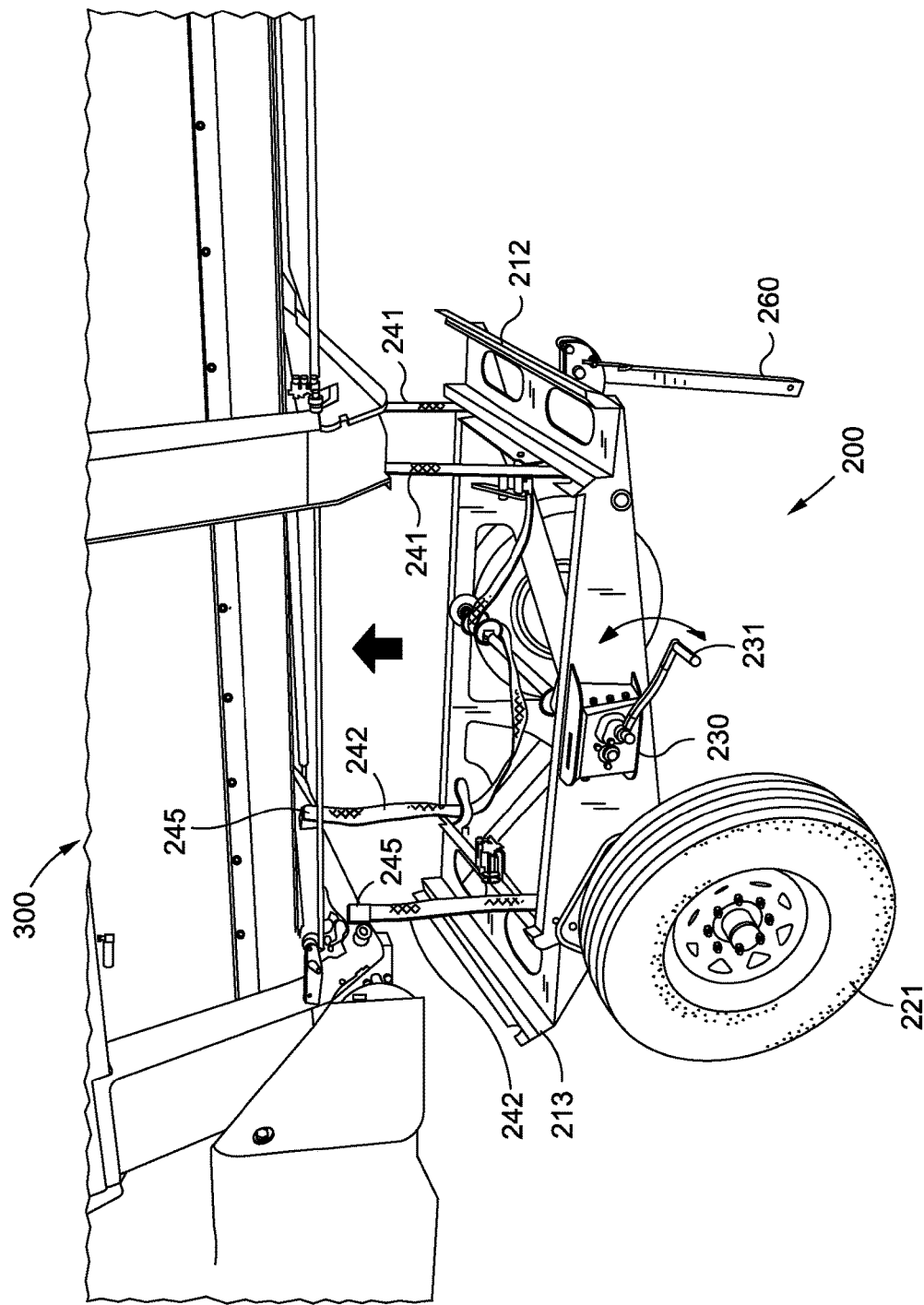
FIG. 3B is a perspective view of an embodiment of a rear carrier of the present invention secured to the combine header with straps and ready to be winched into position.

Referring to FIG. 3B, four straps are provided, two front straps 241 and two rear straps 242. In the depicted embodiment, the straps 241 and 242 extend from the winch axle and are fed through guides provided in the frame. As shown, the two front straps 241 can be configured to pass through respective front strap guides 243 (see FIG. 3A), while the two rear straps 242 can be configured to be fed through corresponding rear strap guides 244 (see FIG. 3A). Referring to FIG. 3B, the distal ends of each strap 241 and 242 can then be pulled upwards where they can engage a location on the harvesting header via strap fasteners 245 located substantially at the end of each strap. In some embodiments, the strap guides 243 and 244 may simply provide a smooth surface for straps to glide over. The strap guide may also be operative to bear a portion of the tension applied to the header straps when the winch mechanism is operated. In some embodiments, it may be desirable to provide a roller mechanism over which the strap runs, the roller mechanism substantially reducing friction between the strap and its guide, and thereby reducing wear and tear on straps.

Generally, the header straps 241 and 242 include the strap fasteners 245 which act as means to allow the straps to be reversibly secured or removably connected to the header structure. In some embodiments, the means to reversibly secure the straps to the header comprise at least one of a hook, and a snap, or another analogous structure. For example, strap fasteners can comprise any of a number of structures, including open hooks that engage a portion of the harvesting header superstructure. The precise nature of the means of fastening a strap to the harvesting header is not considered limiting to the scope of embodiments of the invention. The means of fastening may be located at the distal end of each strap.

For example, in an embodiment, the distal end of a strap may include a hook or eye designed to engage a complimentary structure located some distance away from the distal end of the strap. In this configuration one will appreciate that to secure the strap to the header, the end of the strap can be passed through some portion of the header structure and then looped back on itself to secure the end back to the strap. In some embodiments, a header strap hook might engage a complementary structure on the header without requiring any portion of the strap to directly engage or otherwise wrap around a portion of the header structure. When the strap fasteners 245 are secured to the header structure, the winch and the straps may be considered to be connected to the header and the frame 210 of the rear carrier 200.

Figure 3C:
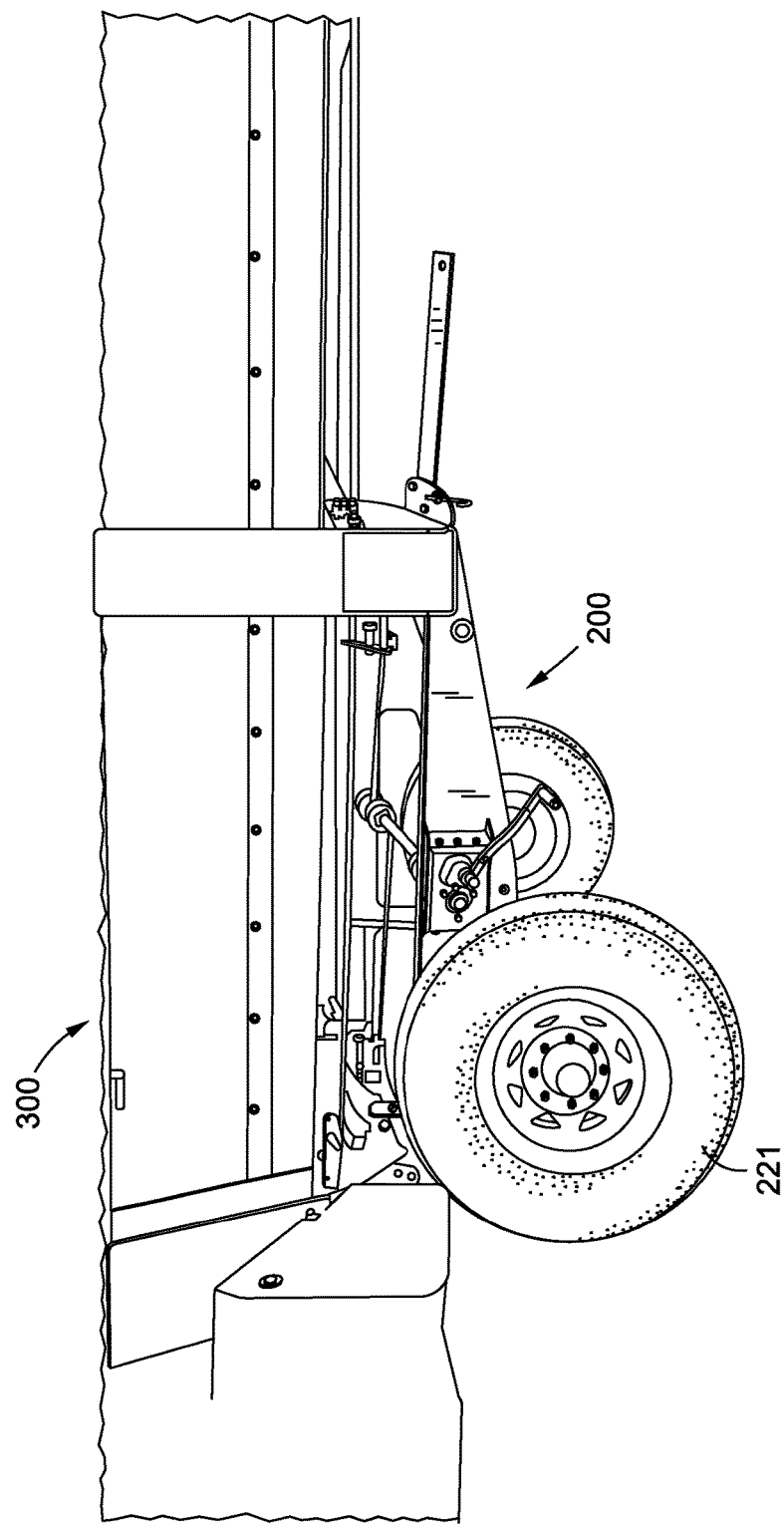
FIG. 3C is a perspective view of an embodiment of a rear carrier of the present invention secured to the combine header and winched into position.

Referring to FIGS. 3A-3C, the rear carrier 200 also includes a stand 260 attached to the frame 210. In some embodiments the stand 260 is designed to be movable. Thus, when the rear carrier 200 is being positioned, or when being stored, the stand 260 maintains the rear carrier 200 substantially level to the surface it is sitting on. This may improve the ease of use of the rear carrier 200 in terms of positioning it with respect to the harvesting header. It also may keep components of the frame 210 off the ground thereby preventing inadvertent damage to the front of the rear carrier frame structure. The stand 260 can be pivotally mounted such that when not in use it can be rotated and secured out of the way. The stand 260 can further include means of securing it in a desired position, such as through the use of a locking pin to engage the stand member with respect to a mount that connects the stand to the frame. The operation of the stand 260 may be analogous to that of a kickstand and so those of skill will readily appreciate how the stand operates and the various configurations that may be useable in conjunction with embodiments of the present invention.

The apparatus of embodiments of the present invention as described herein may provide additional advantages in a method of securing and transporting a harvesting header that improves upon prior art solutions to this problem. A fundamental limitation in some prior art apparatuses is the need to have multiple people involved in the trailering of the harvesting header. This may be obviated by embodiments of the present invention.

In one embodiment, the front carrier 100 will be positioned between the center of balance and one end of the harvesting header to be transported, under the bottom plane of the header. The relatively small size of the front carrier 100 may make it easily amenable to moving by one person. Once in the desired position, a user can then attach the front carrier 100 to the header via the header support 127. As discussed above, one end of the header support 127 engages a header support mount 123 on the frame of the front carrier 100, while the opposite end engages a portion of the harvesting header superstructure. In some embodiments, the header support 127 may be designed to be able to pivot about the front connector 125.

As discussed in some embodiments the front connector 125 comprises a ball hitch and the header support 127 is designed to be able to engage and pivotally rotate laterally about the hitch such that the front carrier 100 can more accurately track the vehicle towing the harvesting header. The end of the header support 127 that engages the harvesting header may be attached in any number of ways including clamping to the superstructure, bolting to holes in the harvesting header framing that are designed to accept the header support member, and other similar attachments.

In some cases it may be desirable to design the system such that the mounting point on the harvesting header is pivotally attached to the header support 127 allowing that end of the support 127 to rotate laterally. In some embodiments at least one end of the header support 127 will be pivotally connected to its respective mounting point in order to permit the lateral rotation of the front carrier 100 relative to the longitudinal axis of the harvesting header during positioning of the front carrier 100 and/or towing of the header.

In some embodiments, the rear carrier 200 may provide a novel method of connecting a transport system to a harvesting header. In some prior art transport systems, the harvesting header may be lowered onto a trailer, secured, and then disengaged from the rest of the combine vehicle. In embodiments of the present case, the inventors have developed the concept of connecting the rear carrier 200 to the combine header and then raising the rear carrier 200 into position, and finally securing the harvesting header so that it is ready for transport.

Figure 1C:
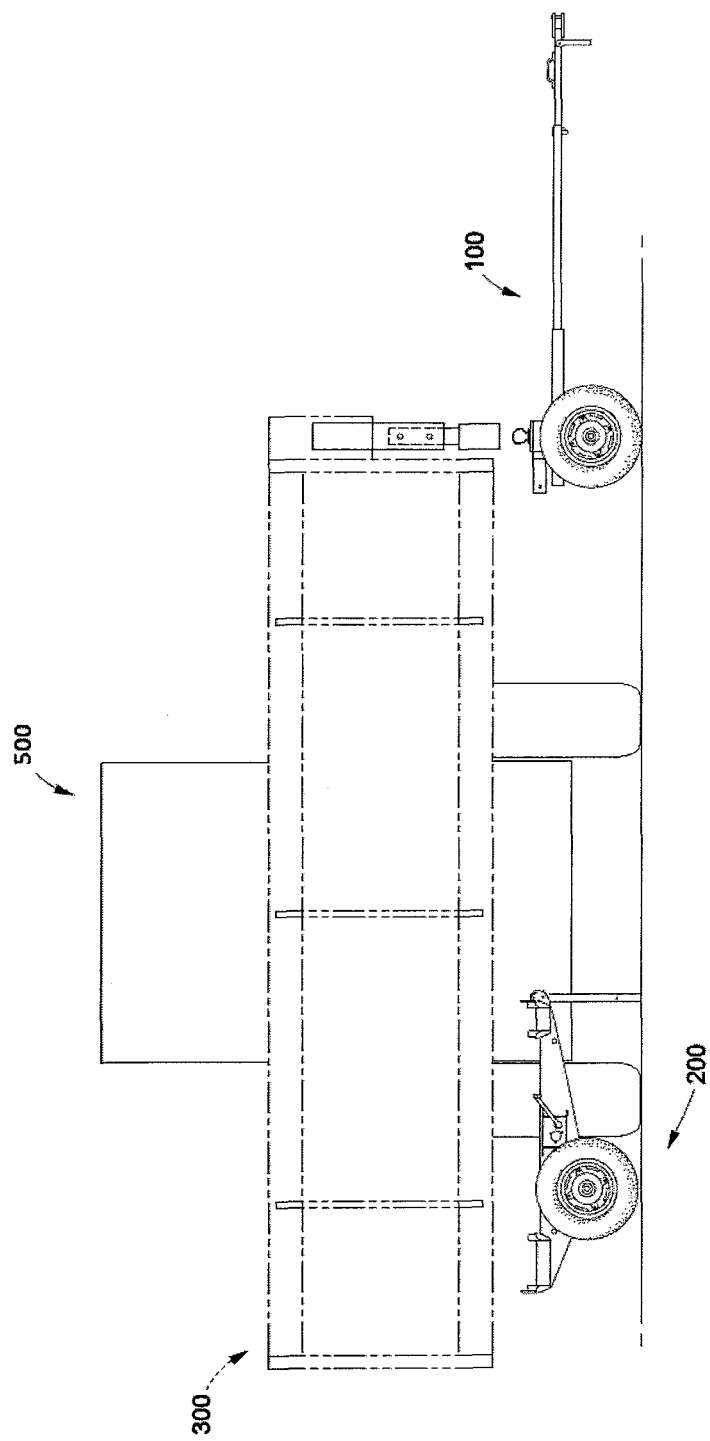
FIG. 1C is a side view of an embodiment of the invention.

Therefore, in accordance with an embodiment of a method of transporting a harvesting header, the rear carrier 200 is first positioned at a point under the bottom plane of the harvesting header between the center of balance towards an end of the harvesting header opposite to that where the user intends to (or already has) positioned the front carrier. Referring to FIG. 1C, at this stage the harvesting header 300 is attached to the combine or harvesting equipment 500 and positioned in an elevated position so that the user can easily place the rear carrier 200 under the header.

Releasing the locking mechanism on the winch, the user is able to unwind and/or extend the straps 241 and 242 from the winch axle 235 and if the straps are not already so positioned, to pass each strap through its appropriate strap guide in cases where the apparatus includes one or more strap guides. Each strap will then be attached to a location on the harvesting header as described above, and as depicted in FIG. 3B. Once each strap is in place, the user will operate the winch 230 to roll the straps back onto the winch axle, thus retracting the straps. Operating the winch can be performed manually using the winch handle 231 as depicted in the accompanying drawings, or via activation of a motorized winch in an embodiment employing that type of a winch drive mechanism.

Winding the straps 241 and 242 onto the axle 235 will eventually take the slack out of the straps and when sufficient tensions are created, the rear carrier 200 will be lifted off the ground and upwards towards the harvesting header where it will eventually engage with and/or be secured to the rear carrier support zone. The strap guides 243 and 244 may operate to transmit the tension applied on the straps into an upwardly acting bias force sufficient to lift the rear carrier into position, as shown in FIG. 3C. The strap guides may facilitate commonly locating the tension to a single winch. In some embodiments, the guides 243 and 244 may translate vertical tension in the straps 241 and 242 into opposing horizontal tension which is received at the axle 235. Accordingly, the net force on the axle 235 from the straps 241 and 242 may be reduced by the guides 243 and 244 and thus a connection between the axle 235 and the frame 210 may not need to bear as much force as would be required without the guides 243 and 244.

The winch 230 may be operated until the user determines that the rear carrier 200 is positioned securely under the harvesting header and in the desired position within the rear carrier support zone. Once that is achieved the winch 230 can be placed in the locked position in order to maintain the tension on the straps 241 and 242. Referring back to FIG. 3A, in the embodiment shown, the rear carrier 200 includes safety connectors or locks 254 and 256 which are operable to engage with and secure to the header when the rear carrier is lifted into engagement with the carrier. In one embodiment, the safety connectors 254 and 256 may each include a sliding pin that engages the header to secure the rear carrier 200 to the header. Once secured to the header, the safety connectors 254 and 256 may hold the rear carrier in position, even if the winch 230 and/or straps 241 and 242 holding the carrier were to disengage or fail.

In some embodiments, once satisfied the rear and front carriers 200 and 100 are properly secured (as can be appreciated by reference to FIGS. 2C and 3C), the user can then lower the harvesting header towards the ground such that the wheels of the rear carrier 200 are on the ground supporting a portion of the weight of the header, with the remainder of the load being supported by the front carrier 100, as shown in FIG. 1A. In addition to being able to conveniently transport a combine header as shown in FIG. 1A, in some embodiments, the invention can be adapted to secure and transport other bulky loads 301 as shown in FIG. 1B.

In some embodiments of the method, the user can position and install the rear carrier as described above, and once the rear carrier 200 is in position, then connect the front header support 127 to the header, and then lower the header to align and attach the front connector 125 of the front carrier 100 to the front header support 127. In some embodiments, the order in which the front and rear carrier supports are secured to the header may be changed. In some cases, a user may decide to first secure the front carrier 100 and then the rear carrier 200, or vice versa. In some embodiments, once the front and rear carriers 100 and 200 have been secured to the header and the header lowered such that the entire weight of the header is borne by the front and rear carriers acting cooperatively, the header can then be safely disconnected from the combine.

Depending on the preferences of the user, in some cases it may be desired to secure the rear carrier 200 in place, then attach the header support 127 to the header at a location towards the other end of the header, and then secure the front connector 125 to the header support 127 prior to lowering the harvesting header. In other cases, it might be desired to secure the rear carrier 200 in position, then lower the harvesting header part way to the ground, and then position the front connector 125 under the header support 127, and then lower the header the remaining distance to engage the header support 127 to the front connector 125 on the front carrier 100. As can be seen the specific steps can be performed in various orders and achieve the result of securing the harvesting header to the front and rear carriers 100 and 200 in accordance with embodiments of the invention. The order of executing these steps may be one of personal preference of the user.

Finally, once the front and rear carriers 100 and 200 are positioned and secured, and the harvesting header is lowered such that the weight of the header is supported on the carrier system, the header can then be disconnected from the combine. At this stage the harvesting header is ready for transport and can simply be towed away after connecting the front carrier 100 to a hitch or other like connecting on the vehicle to be used to tow the header. Upon moving the header to the desired site, the steps by which the header was secured to the front and rear carrier may be simply reversed. In some cases, the harvesting header may be left mounted on the carrier system as may be desired for storage after the growing season is over.

In some embodiments one or more carriers generally similar to the rear carrier 200 shown in FIGS. 3A-3C may be used in place of the front carrier 100 and/or the rear carrier 200. In some embodiments one or more carriers generally similar to the front carrier 100 shown in FIGS. 2A-2C may be used in place of the front carrier 100 and/or the rear carrier 200. In one embodiment, where a carrier similar to the rear carrier 200 is used in place of the front carrier 100, the carrier similar to the rear carrier 200 may include a steering mechanism.

Retractor Connected to the Header

Figure 4:
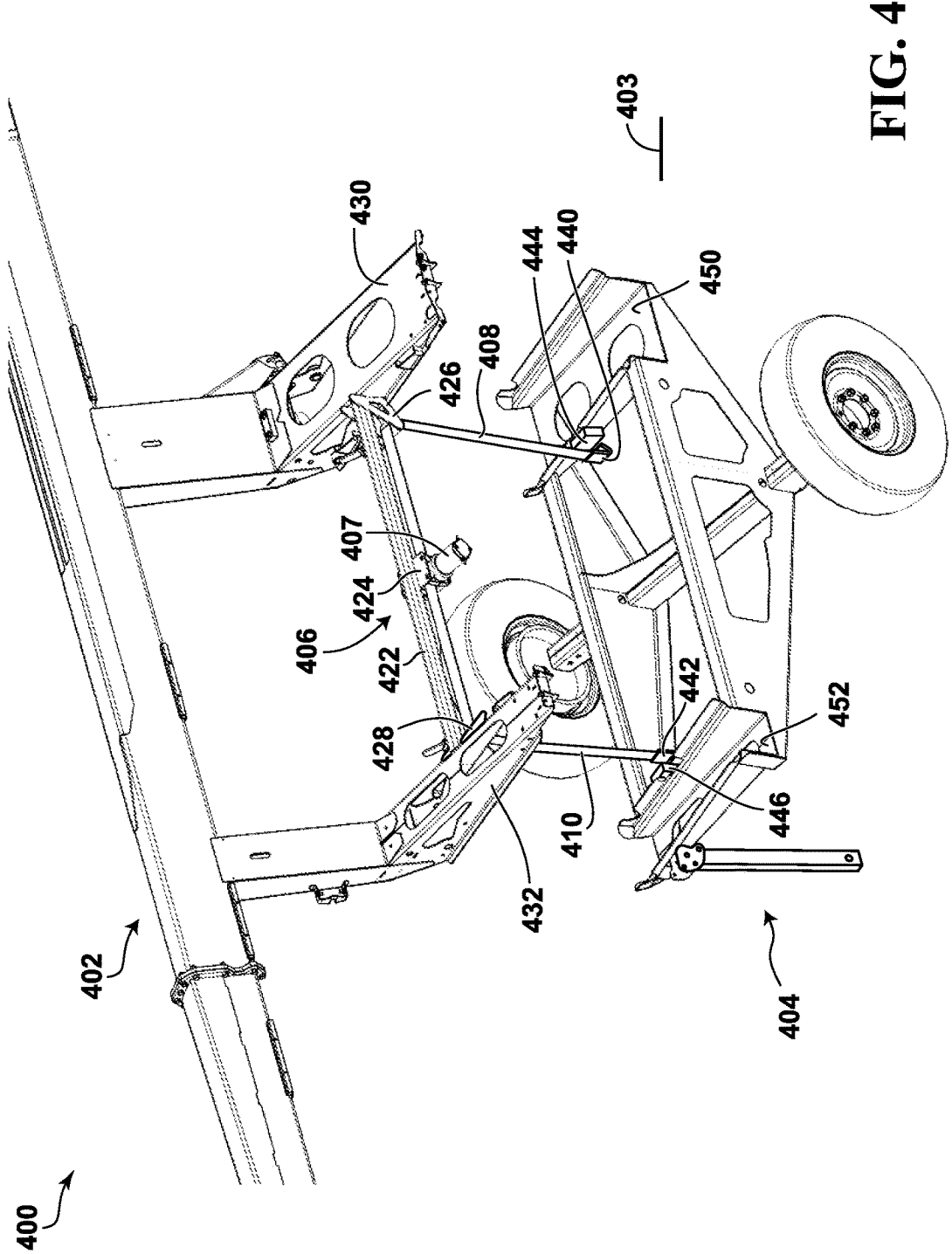
FIG. 4 is a perspective view of a harvesting header carrier according to an embodiment of the invention in a first configuration.

Referring to FIG. 4, an apparatus in accordance with one embodiment of the invention is shown at 400. The apparatus 400 includes a harvesting header 402, a harvesting header carrier 404, and a positioning adjustment mechanism 406 operable to lift the harvesting header carrier 404 off a support surface 403 into engagement with the harvesting header 402. In some embodiments, the harvesting header carrier 404 and the positioning adjustment mechanism 406 may be used similarly to as described above having regard to the rear carrier 200 shown in FIGS. 1A-1B and 3A-3C.

In the embodiment shown in FIG. 4, the positioning adjustment mechanism 406 includes a winch 407, which acts as a retractor and is connected to the harvesting header 402. The positioning adjustment mechanism 406 also includes first and second straps 408 and 410 coupled to the winch 407. The straps 408 and 410 may act as tension links or flexible elongate supports. In the embodiment shown, the winch 407 is mounted to a support beam 422 of the harvesting header 402 via a mount 424 of the winch 407. In the embodiment shown, the mount 424 is connected to the support beam 422 by welding. In some embodiments, the mount 424 may be connected to the support beam 422 by another connection, such as, for example by rivets, by a threaded connection such as a bolted connection or by an adhesive connection.

The positioning adjustment mechanism 406 includes first and second guides 426 and 428, which are connected to first and second header members 430 and 432 of the header 402. The straps 408 and 410 extend from the winch 407, pass through the guides 426 and 428 respectively and extend downwardly therefrom.

Referring still to FIG. 4, the positioning adjustment mechanism 406 includes first and second hook connectors 440 and 442 which are connected to respective ends of the first and second straps 408 and 410. In the embodiment shown in FIG. 4, the first and second hook connectors 440 and 442 are connected to the first and second straps 408 and 410 using sewing or stitching to hold the hook connectors. The first and second hook connectors 440 and 442 may act as carrier connectors and may be removably connectable to the harvesting header carrier 404.

The harvesting header carrier 404 includes a first hook connector receiver 444 connected to a first support 450 of the harvesting header carrier 404. The first hook connector receiver 444 is configured to receive the first hook connector 440 such that the first hook connector 440 is removably connectable to the first hook receiver 444. In the embodiment shown in FIG. 4, the first hook connector receiver 444 includes a member having an opening that generally corresponds to the shape and size of the first hook connector 440. The harvesting header carrier 404 also includes a second hook connector receiver 446 generally similar to the first hook connector receiver 444, but connected to a second support 452 of the harvesting header carrier 404 and configured to receive the second hook connector 442.

In operation, the header 402 may be supported above the support surface 403, such as, by a combine harvester, and a user may position the harvesting header carrier 404 generally below the harvesting header 402, as shown in FIG. 4. The user may then cause the first and second hook connectors 440 and 442 to removably connect to the first and second hook connector receivers 444 and 446 respectively.

In some embodiments, the first and second straps 408 and 410 are flexible and thus facilitate moving and removably connecting the first and second hook connector 440 and 442 to the hook connector receivers 444 and 446, even when the harvesting header carrier 404 is not vertically aligned with the harvesting header 402. In some embodiments, the first and second straps 408 and 410 may be extendable to lengths that facilitate the connectors 440 and 442 hanging to a height lower than heights of the receivers 444 and 446 respectively to facilitate connecting the hook connectors with the hook connector receivers.

Figure 5:
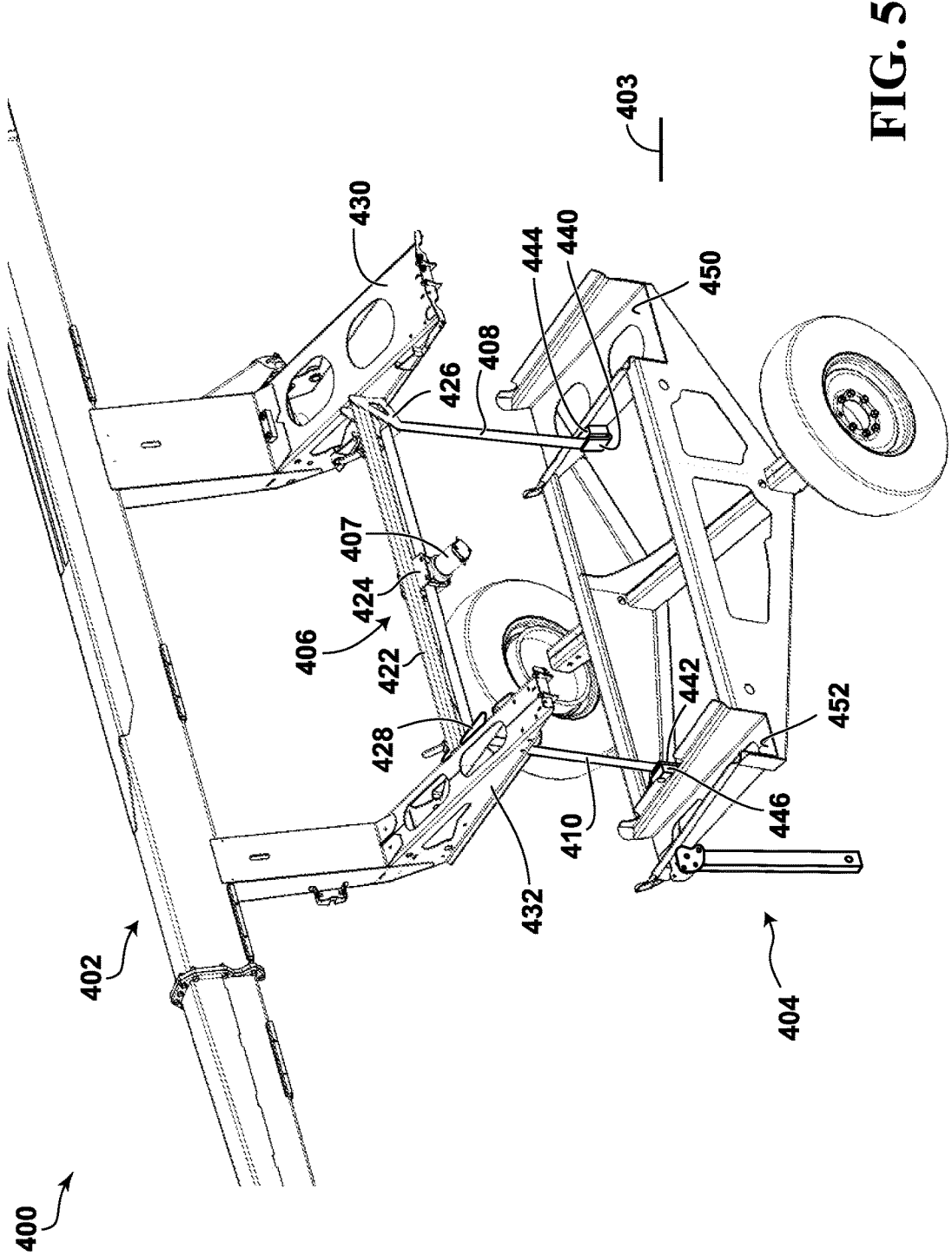
FIG. 5 is a perspective view of the harvesting header carrier shown in FIG. 4 in a second configuration.

FIG. 5 shows the apparatus 400 of FIG. 4 wherein the first and second hook connectors 440 and 442 have been connected to the first and second hook connector receiver 444 and 446 respectively. Once the first and second hook connectors 440 and 442 have been connected to the first and second hook connector receiver 444 and 446, the winch 407 and the straps 408 and 410 may be considered to be connected to the harvesting header 402 and the harvesting header carrier 404.

Figure 6:
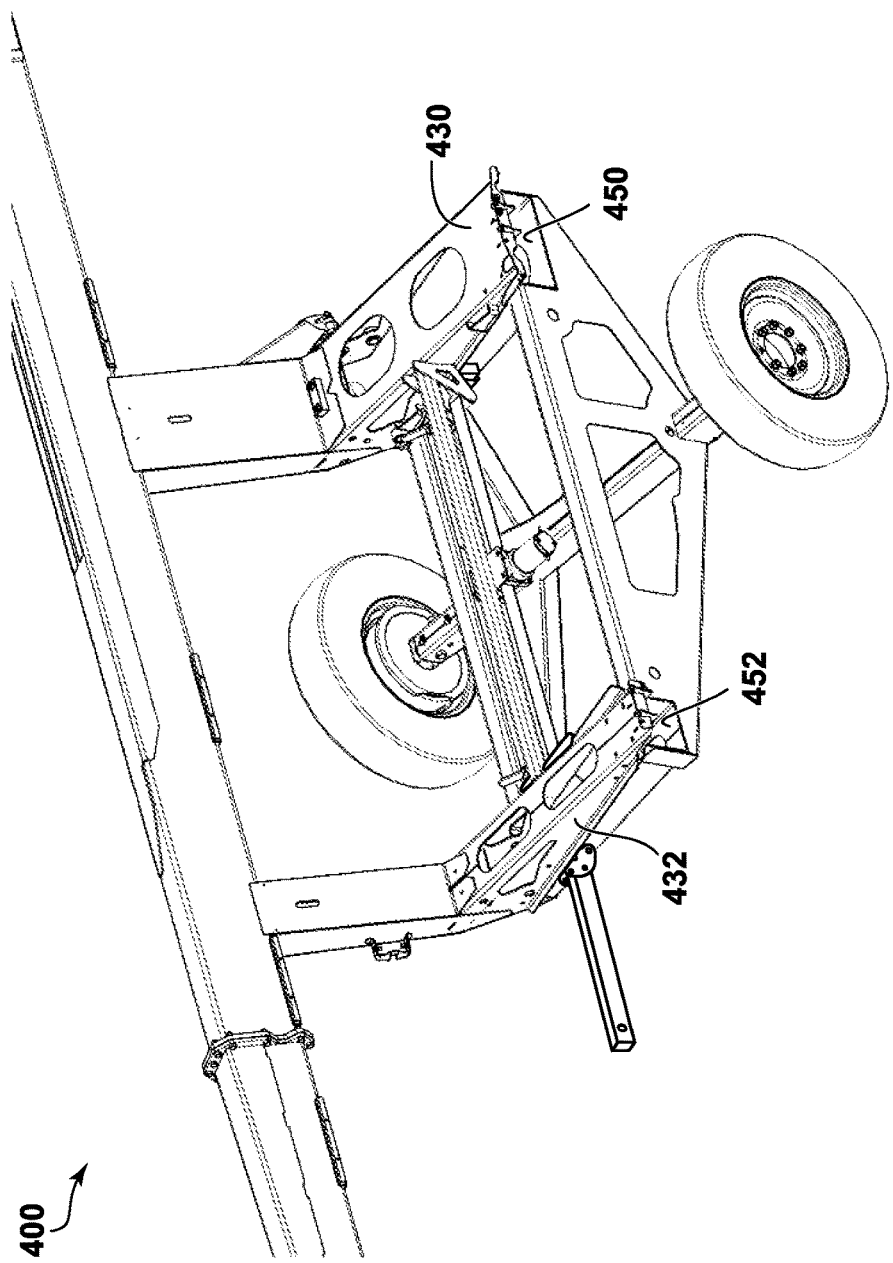
FIG. 6 is a perspective view of the harvesting header carrier shown in FIG. 4 in a third configuration.

Once the first and second hook connectors 440 and 442 have been connected to the harvesting header carrier 404, as shown in FIG. 5, the user may cause the winch 407 to retract the first and second straps 408 and 410 to shorten the straps and cause the harvesting header carrier 404 to be lifted towards and engage with the harvesting header 402, as shown in FIG. 6. In some embodiments, the winch 407 includes a motor that is operable to control retraction of the straps 408 and 410, such as, for example, by rotating an axle on which the straps are connected. A user may cause the winch 407 to retract by pressing a button or a switch coupled to the winch, for example. In other embodiments, the winch 407 may be operated using a non-motor actuator. For example, in some embodiments, the winch 407 may be hand powered and may include a hand crank, for example.

Referring to FIG. 5, the guides 426 and 428 guide the straps 408 and 410 to the winch and bear tension applied to the straps when the winch 407 is operated. In the embodiment shown in FIG. 5, the guides 426 translate vertical tension in the straps 408 into opposing horizontal tension which is received at the winch 407. Accordingly, the net force on the winch 407 from the straps 408 and 410 may be reduced by the guides 426 and 428 and the mount 424 may not need to bear as much net force as would be required without the guides 426 and 428.

Referring still to FIG. 5, in some embodiments, the first and second hook connector receivers 444 and 446 may be positioned such that when the harvesting header carrier 404 is lifted towards the harvesting header 402, the harvesting header carrier 404 becomes or remains oriented for engagement with the harvesting header 402. For example, in some embodiments, the first and second hook connector receivers 444 and 446 may be positioned at or near a center of gravity of the harvesting header carrier 404, such that the harvesting header carrier 404 does not rotate when it is lifted via the first and second hook connector receivers.

For example, the first and second hook connector receivers 440 and 442 may be positioned such that a vertical plane that passes through a center of gravity of the harvesting header carrier 404 when the harvesting header carrier 404 is oriented for engagement with the harvesting header 402 passes through the first and second hook connector receivers.

In some embodiments, the first and second straps 408 and 410, hook connectors 440 and 442, and hook connector receivers 444 and 446 may have widths that facilitate the first and second straps 408 and 410 applying torque about a roll axis of the harvesting header carrier 404 such that the straps may be able to keep the harvesting header carrier 404 oriented for engagement with the harvesting header 402 as the harvesting header carrier 404 is lifted towards the harvesting header 402. For example, in the embodiment shown in FIG. 4, the first and second straps 408 and 410, hook connectors, and hook connector receivers each have a width of about 2-3 inches.

FIG. 6 shows the apparatus 400 of FIGS. 4 and 5 after the winch 407 has retracted the first and second straps 408 and 410. Referring to FIG. 6, when the straps 408 and 410 have been retracted, the harvesting header carrier 404 may receive the first and second header members 430 and 432 within the first and second supports 450 and 452.

When in the configuration shown in FIG. 6, the harvesting header 402 and the harvesting header carrier 404 may be aligned such that, if the apparatus is lowered 400 to the ground, the harvesting header 402 would be supported by the harvesting header carrier 404. Accordingly, once the apparatus 400 is in the configuration shown in FIG. 6, a user may cause the apparatus 400 to be lowered. For example, the harvesting header 402 may have been held above the support surface 403 by a combine and so the user may use the combine to lower the apparatus 400 to the support surface 403.

In the embodiment shown, the first and second supports 450 and 452 have a slope that accommodates supporting the harvesting header 402 when the harvesting header is in rigid mode wherein the cutter bar is in an up position and when the harvesting header is in flex mode wherein the cutter bar is in a down position.

In some embodiments, the apparatus 400 may include one or more additional harvesting header carriers operable to support the harvesting header 402 at one or more additional locations on the harvesting header 402. In some embodiments, the additional harvesting header carriers may include a carrier generally similar to the harvesting header carrier 404 shown in FIGS. 4-6, a carrier generally similar to the front carrier shown in FIGS. 2A-2C, and/or a carrier generally similar to the rear carrier shown in FIGS. 3A-3C. In some embodiments, a user may first align and engage each of the harvesting header carriers with the harvesting header before lowering the apparatus 400. In some embodiments, the carriers may be operable to hold the harvesting header 402 above the support surface 403 with the harvesting header having a tilt or rotation about an axis parallel to the direction of travel of the carriers, such that the center of gravity of the header 402 is aligned with the carriers.

When the apparatus 400 has been lowered such that the harvesting header carrier 404 and any additional carriers are supporting the apparatus 400 on the support surface 403, a user may disconnect the harvesting header 402 from the combine and transport the apparatus 400 using the carriers, for example, by towing the apparatus 400 behind a towing vehicle.

Thus, it is clear that embodiments of the invention may provide an improved device and method of transporting a harvesting header. Embodiments of the present invention may be optimized for use in a wide range of conditions and applications, and with various models of farm equipment. While specific embodiments of the invention have been described and illustrated, such embodiments should be considered illustrative of the invention only and not as limiting the invention as construed in accordance with the accompanying claims.

Those skilled in the art will recognize that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A method of preparing a harvesting header for transport by a harvesting header carrier, the harvesting header being initially supported above the harvesting header carrier, the method comprising:
   linking the harvesting header and the harvesting header carrier via at least one tension link and at least one retractor coupled to the at least one tension link;
   causing the at least one retractor to retract the at least one tension link to shorten the at least one tension link and cause the harvesting header carrier to be lifted towards and engage with the harvesting header.

2. The method of claim 1 wherein the at least one retractor is connected to the harvesting header carrier and wherein linking the harvesting header and the harvesting header carrier comprises removably connecting the at least one tension link to the harvesting header.

3. The method of claim 1 wherein the at least one retractor is connected to the harvesting header and wherein linking the harvesting header and the harvesting header carrier comprises removably connecting the at least one tension link to the harvesting header carrier.

4. The method of claim 3 wherein removably connecting the at least one tension link to the harvesting header carrier comprises removably connecting at least one carrier connector coupled to the at least one tension link to the harvesting header carrier.

5. The method of claim 4 wherein the at least one carrier connector comprises a hook connector.

6. The method of claim 1 wherein the at least one tension link comprises at least one strap.

7. The method of claim 1 wherein the at least one retractor comprises a winch and wherein causing the at least one retractor to retract the at least one tension link comprises causing the winch to retract the at least one tension link.

8. The method of claim 7 wherein the at least one retractor comprises at least one guide and wherein causing the at least one retractor to retract the at least one tension link comprises causing the at least one guide to guide the at least one tension link to the winch and to bear tension applied to the at least one tension link.

9. The method of claim 7 wherein the winch comprises a motor operable to control retraction of the at least one tension link.

10. The method of claim 1 further comprising lowering the harvesting header after the harvesting header carrier has been lifted into engagement with the harvesting header to cause the harvesting header carrier to engage with a support surface below the harvesting header and the harvesting header carrier such that the harvesting header carrier supports the harvesting header above the support surface.

11. A method of transporting a harvesting header, said header including a front end proximate to and representing the front of the header when oriented for towing in transport mode and a back end at the opposing end of the header from the front end, the method comprising:
   providing the header to be transported, wherein the header is elevated above the ground surface, said header including a front carrier support connected to the bottom plane of the header at or near the front end, wherein the bottom plane of the header at or near the back end thereof comprises a rear carrier support zone;
   positioning a rear carrier on the ground beneath the rear carrier support zone of the header, said rear carrier comprising:
   a rear carrier frame which can be attached to the bottom plane of the header in the rear carrier support zone by header connectors thereon;
   at least one rear wheel assembly attached to the rear carrier frame such that the at least one rear wheel assembly is oriented in the direction of transport of the header when the rear carrier frame is attached to the rear carrier support zone;
   more than one extendable header strap attached thereto, each header strap having a header hook on the distal end thereof which can be connected to the header in the rear carrier support zone;

extending the extendable header straps so that the extended header straps can reach attachment points on the header beneath the rear carrier support zone where the header hooks are attached;

retracting the header straps, lifting the rear carrier into position in the rear carrier support zone on the bottom plane of the header, where the rear carrier can be connected to the header by the header connectors;

placing a front carrier on the ground below the front end of the header, in alignment with the front carrier support, said front carrier comprising a steerable front wheel assembly with a towing member and hitch attached thereto, and adapted to attachably engage the front header support to attach the front carrier to the header;

lowering the header to align and attach the front carrier to the front carrier support;

wherein upon attachment of the header to the front carrier and rear carrier, the combined unit is trailable behind a power unit hitched thereto.

12. The method of claim 11, wherein the front carrier support further comprises a plurality of members adapted to be telescoped within one another, and locking means to restrict movement of said members once the front carrier support has been telescoped to a desired length.

13. The method of claim 11, wherein the header is secured to the front carrier before the rear carrier.

14. The method of claim 11, wherein the header is secured to the rear carrier before the front carrier.

15. The method of claim 11 wherein the rear carrier further comprises a winch on the rear carrier frame, attached to the header straps, whereby operation of the winch will result in the extension or retraction of the header straps.

16. The method of claim 11, wherein once the front and rear carriers are secured to the header, the header is lowered until substantially all the weight of the header is borne by the front and rear carriers acting cooperatively.

17. The method of claim 11, further comprising disconnecting the header from the combine once substantially all the weight of the header is borne by the front and rear carriers.

* * * * *